US010045217B2

(12) United States Patent
Stan et al.

(10) Patent No.: US 10,045,217 B2
(45) Date of Patent: Aug. 7, 2018

(54) NETWORK APPLIANCE FOR PROTECTING NETWORK ENDPOINTS AGAINST COMPUTER SECURITY THREATS

(71) Applicant: Bitdefender IPR Management Ltd., Nicosia (CY)

(72) Inventors: Cosmin C. Stan, Slatina (RO); Andrei Rusu, Bucharest (RO); Bogdan C. Cebere, Bucharest (RO); Alexandru I. Achim, Targu Jiu (RO)

(73) Assignee: Bitdefender IPR Management Ltd., Niscosia (CY)

( * ) Notice: Subject to any disclaimer, the term of this patent is extended or adjusted under 35 U.S.C. 154(b) by 34 days.

(21) Appl. No.: 14/966,344

(22) Filed: Dec. 11, 2015

(65) Prior Publication Data
US 2016/0234231 A1 Aug. 11, 2016

Related U.S. Application Data
(60) Provisional application No. 62/090,547, filed on Dec. 11, 2014, provisional application No. 62/180,390, (Continued)

(51) Int. Cl.
*H04W 12/08* (2009.01)
*H04W 76/12* (2018.01)
(Continued)

(52) U.S. Cl.
CPC ............ *H04W 12/08* (2013.01); *G06F 9/542* (2013.01); *H04L 12/4633* (2013.01);
(Continued)

(58) Field of Classification Search
None
See application file for complete search history.

(56) References Cited

U.S. PATENT DOCUMENTS 7,809,811 B1 10/2010 Rao
8,996,659 B2 3/2015 Werth et al.
(Continued)

FOREIGN PATENT DOCUMENTS

EP 2575319 A1 4/2013

OTHER PUBLICATIONS

Jim Yuill, "Using Deception to Hide Things from Hackers: Processes, Principles and Techniques" Journal of Information Warfare, ISSN 1445-3312 print/ISSN 1445-3347 online, 2006, p. 1-16.*
(Continued)

*Primary Examiner* — Joseph P Hirl
*Assistant Examiner* — Hassan Saadoun
(74) *Attorney, Agent, or Firm* — Law Office of Andrei D. Popovici, PC

(57) ABSTRACT

In some embodiments, a network regulator device protects a local network of client systems (e.g. Internet-of-things devices such as smartphones, home appliances, wearables, etc.) against computer security threats. When introduced to the local network, some embodiments of network regulator automatically take over network services from an existing router, and install the network regulator as gateway to the local network. In response to taking over the network services, some embodiments redirect a request by a protected client system to access a remote resource to a security server configured to determine whether granting access to the resource constitutes a computer security threat to the client system.

30 Claims, 17 Drawing Sheets

Related U.S. Application Data filed on Jun. 16, 2015, provisional application No. 62/217,310, filed on Sep. 11, 2015.

(51) Int. Cl.

| | | |
|---|---|---|
| *H04W 76/32* | (2018.01) | |
| *H04L 9/06* | (2006.01) | |
| *H04L 12/46* | (2006.01) | |
| *H04L 29/08* | (2006.01) | |
| *H04L 12/24* | (2006.01) | |
| *H04L 12/26* | (2006.01) | |
| *G06F 9/54* | (2006.01) | |
| *H04L 29/06* | (2006.01) | |
| *H04W 4/70* | (2018.01) | |
| *H04L 29/12* | (2006.01) | |
| *H04W 88/12* | (2009.01) | |
| *H04W 88/16* | (2009.01) | |
| *H04L 12/28* | (2006.01) | |

(52) U.S. Cl.
CPC .......... *H04L 41/0816* (2013.01); *H04L 41/22* (2013.01); *H04L 43/0876* (2013.01); *H04L 63/02* (2013.01); *H04L 63/029* (2013.01); *H04L 63/0272* (2013.01); *H04L 63/101* (2013.01); *H04L 63/123* (2013.01); *H04L 63/14* (2013.01); *H04L 63/1408* (2013.01); *H04L 63/1416* (2013.01); *H04L 63/1425* (2013.01); *H04L 63/20* (2013.01); *H04L 67/02* (2013.01); *H04L 67/12* (2013.01); *H04W 76/12* (2018.02); *H04W 76/32* (2018.02); *H04L 12/2834* (2013.01); *H04L 61/2015* (2013.01); *H04L 61/2061* (2013.01); *H04L 63/105* (2013.01); *H04W 4/70* (2018.02); *H04W 88/12* (2013.01); *H04W 88/16* (2013.01)

(56) References Cited

U.S. PATENT DOCUMENTS

| | | |
|---|---|---|
| 9,026,648 B1 | 5/2015 | Slavin |
| 9,077,736 B2 | 7/2015 | Werth et al. |
| 2003/0002496 A1* | 1/2003 | Beier ............... H04L 29/12301 370/389 |
| 2005/0208947 A1 | 9/2005 | Bahl |
| 2005/0257065 A1* | 11/2005 | Morris ................ G06F 21/552 713/182 |
| 2007/0021113 A1 | 1/2007 | Hamasaki et al. |
| 2008/0172476 A1* | 7/2008 | Daniel ............... H04L 41/0809 709/220 |
| 2011/0122774 A1 | 5/2011 | Hassan et al. |
| 2011/0125898 A1 | 5/2011 | Hassan et al. |
| 2011/0125925 A1 | 5/2011 | Bouthemy et al. |
| 2012/0167160 A1* | 6/2012 | Carney ................. H04L 45/02 726/1 |
| 2014/0143854 A1* | 5/2014 | Lopez ............... H04L 63/0218 726/14 |

OTHER PUBLICATIONS

European Patent Office, International Search Report and Written Opinion dated Apr. 15, 2016 for PCT Application No. PCT/R02015/050011, international filing date Dec. 11, 2015, priority date Dec. 11, 2014.

Poeter, "Bitdefender unveils IoT Security Appliance," http://www.pcmag.com/article2/0,2817,2472670,00.asp, PCMagazine, New York, NY, USA, Nov. 2014.

Rashid, "Black Hat: Researchers take over Linksys router with simple JavaScript," http://www.scmagazine.com/black-hat-researchers-take-over-linksys-router-with-simple-javascript/printarticle/252521/, SC Magazine, New York, NY, USA, Jul. 2012.

Reese, "Reversing Rorpian-DHCP Hijacking Malware," http://resources.infosecinstitute.com/reversing-rorpian/, Riverse Engineering, InfoSec Institute, Elmwood Park, IL, USA, Dec. 2011.

McMillan, "Web page can take over your router," http://www.infoworld.com/article/2650002/security/web-page-can-take-over-your-router.html, InfoWorld, San Francisco, CA, USA, Apr. 2008.

McMillan, "Flash Attack Could Take Over Your Router," http://www.pcworld.com/article/141399/article.html, PC World, San Francisco, CA, Jan. 2008.

Goodin, Most home routers 'vulnerable to remote take-over', http://www.theregister.co.uk/2008/01/15/home_router_insecurity/, The Register, London, UK, Jan. 2008.

\* cited by examiner

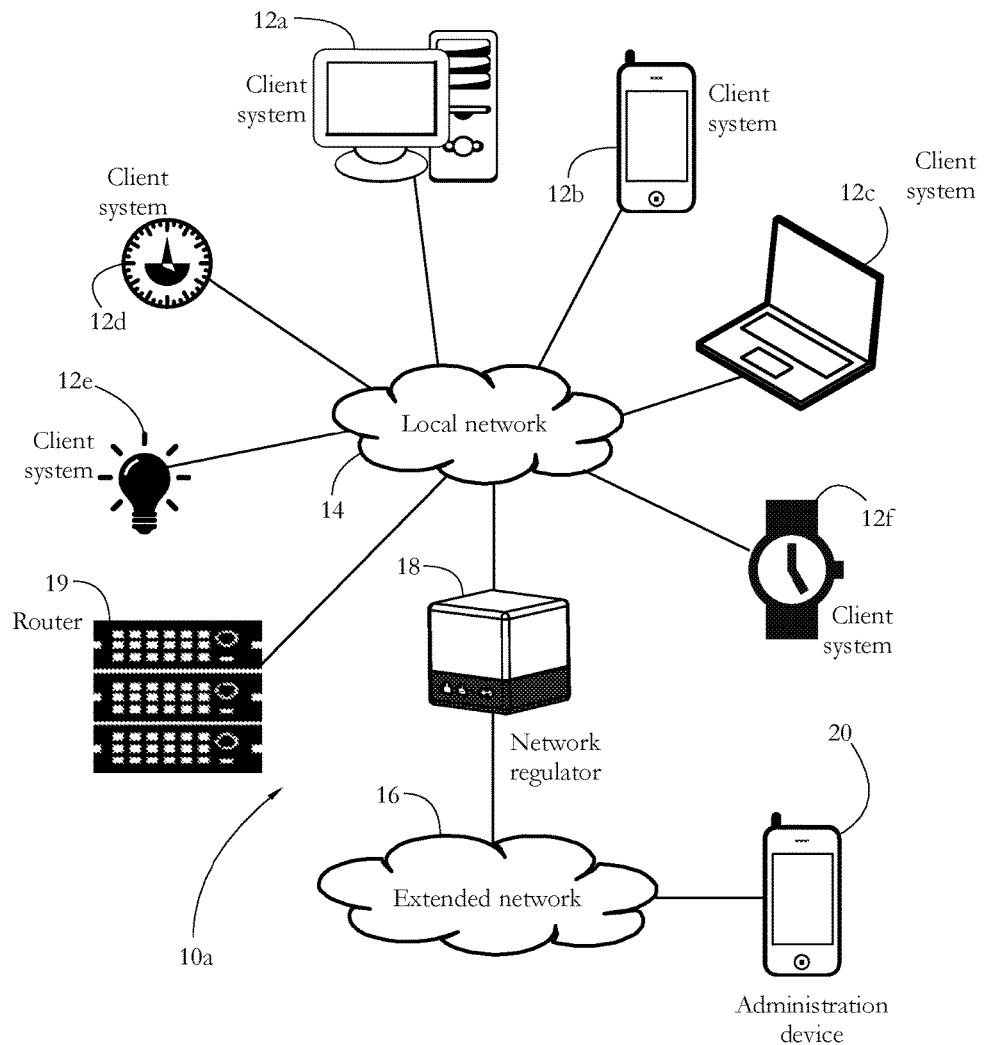
FIG. 1-A

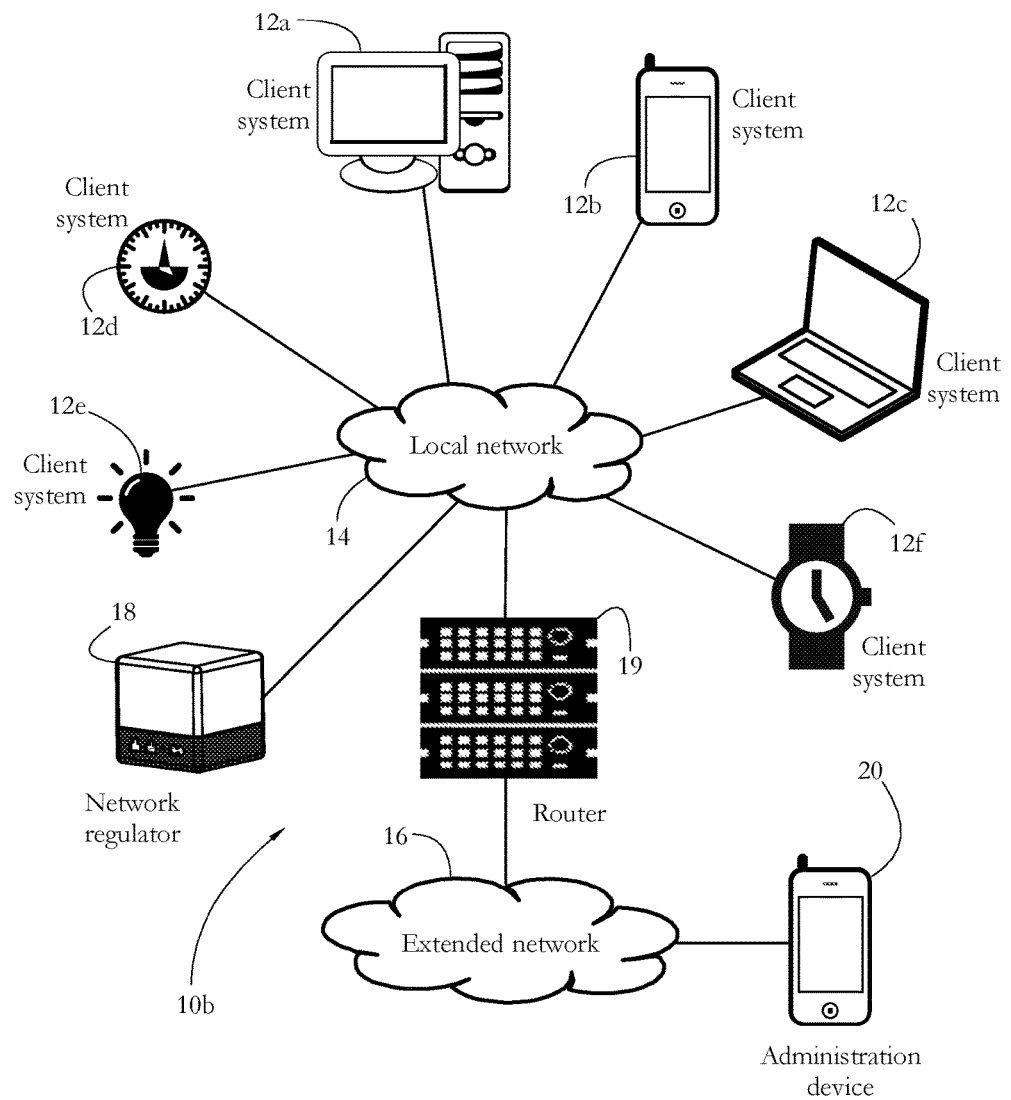
FIG. 1-B

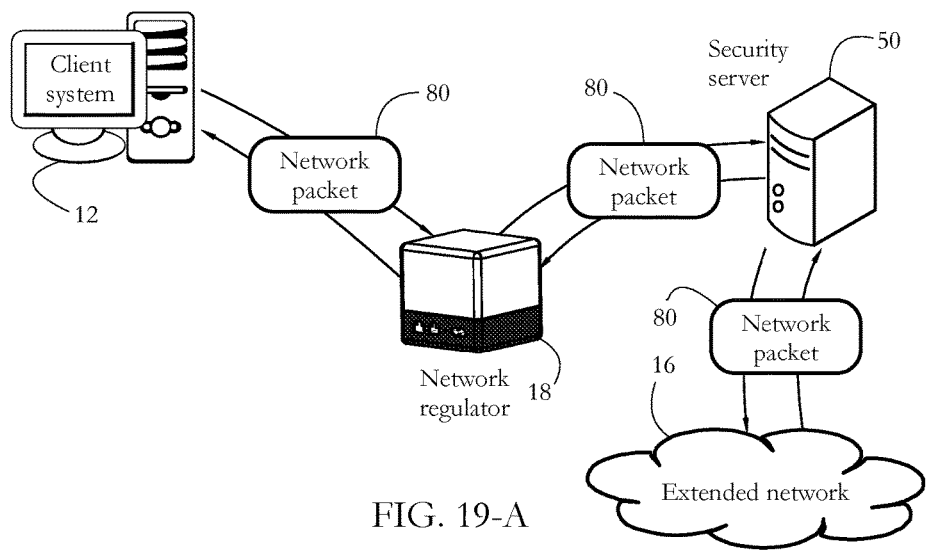
FIG. 19-A
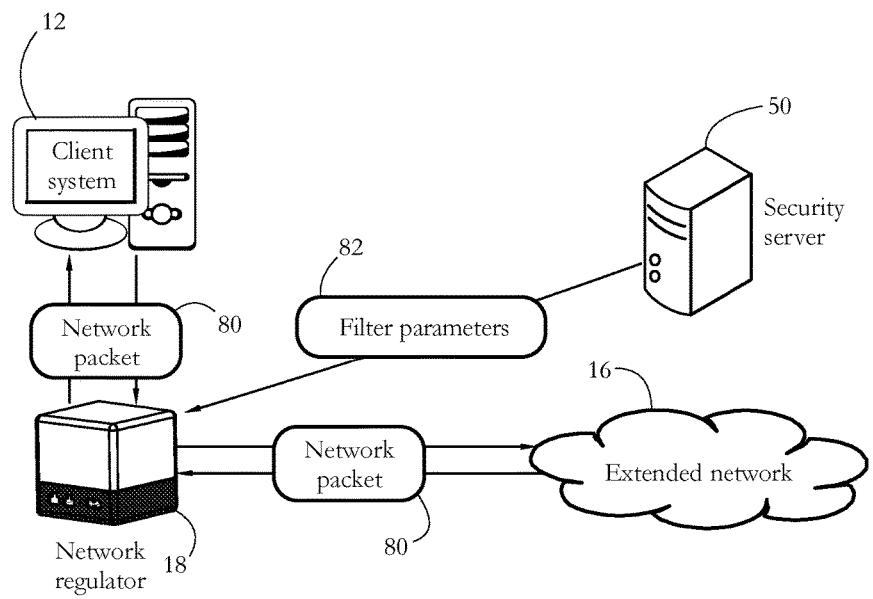
FIG. 19-B

NETWORK APPLIANCE FOR PROTECTING NETWORK ENDPOINTS AGAINST COMPUTER SECURITY THREATS

RELATED APPLICATIONS

This application claims the benefit of the filing date of U.S. provisional patent applications No. 62/090,547, filed on Dec. 11, 2014, entitled "Systems and Methods for Securing Network Endpoints", No. 62/180,390, filed on Jun. 16, 2015, entitled "Systems and Methods for Automatic Device Detection, Device Management, and Remote Assistance", and No. 62/217,310, filed on Sep. 11, 2015, entitled "Systems and Methods for Automatic Network Service Takeover", the entire contents of which are incorporated by reference herein.

BACKGROUND

The invention relates to systems and methods for securing network endpoints against computer security threats, and to systems and methods for automatic device detection and remote device management.

Malicious software, also known as malware, affects a great number of computer systems worldwide. In its many forms such as computer viruses, exploits, and spyware, malware presents a serious risk to millions of computer users, making them vulnerable to loss of data and sensitive information, to identity theft, and to loss of productivity, among others.

A great variety of devices, informally referred to as the Internet of Things (IoT), are currently being connected to communication networks and the Internet. Such devices include, among others, smartphones, smartwatches, TVs and other multimedia devices, game consoles, home appliances, and various home sensors such as thermostats. As more such devices go online, they become targets for security threats. Therefore, there is an increasing need of securing such devices against malware, as well as of protecting communications to and from such devices.

In addition, the proliferation of such intelligent devices in environments such as homes and offices creates an increasing problem of device and network management. When each device uses a distinct configuration interface and requires separate connection settings, managing a large number of such devices may become a burden, especially for a typical home user who is not experienced in network administration. Therefore, there is an increasing interest in developing systems and methods for automatic device detection and configuration, with particular emphasis on security.

SUMMARY

According to one aspect, a network regulator comprises a hardware processor and a memory, the hardware processor configured to automatically take over a network service from a router, the network regulator connected to the router over a local network, the network service comprising assigning network addresses to a plurality of client systems connected to the local network. The hardware processor is further configured, in response to taking over the network service, to intercept a request by a client system of the plurality of client systems to access a resource located outside the local network. The hardware processor is further configured, in response to intercepting the request, to transmit an indicator of the request to a remote security server for analysis, wherein the security server is configured to determine whether accessing the resource constitutes a computer security threat to the client system.

According to another aspect, a security server comprises at least one hardware processor and a memory, the at least one hardware processor configured to receive from a network regulator connected to a remote network an indicator of a request by a client system connected to the remote network to access a resource located outside the remote network. The at least one hardware processor is further configured, in response to receiving the indicator of the request, to determine whether accessing the resource constitutes a computer security threat to the client system. The network regulator is configured to automatically take over a network service from a router connected to the network regulator over the remote network, the network service comprising assigning network addresses to a plurality of client systems connected to the remote network. The network regulator is further configured, in response to taking over the network service, to intercept the request, and in response to intercepting the request, to transmit the indicator of the request to the security server.

According to another aspect, a non-transitory computer readable medium stores instructions which, when executed by at least one hardware processor of a network regulator, cause the network regulator to automatically take over a network service from a router, the network regulator connected to the router over a local network, the network service comprising assigning network addresses to a plurality of client systems connected to the local network. The instructions further cause the network regulator, in response to taking over the network service, to intercept a request by a client system of the plurality of client systems to access a resource located outside the local network. The instructions further cause the network regulator, in response to intercepting the request, to transmit an indicator of the request to a remote security server for analysis, wherein the security server is configured to determine whether accessing the resource constitutes a computer security threat to the client system.

BRIEF DESCRIPTION OF THE DRAWINGS

The foregoing aspects and advantages of the present invention will become better understood upon reading the following detailed description and upon reference to the drawings where:

FIG. 1-A shows an exemplary configuration of client systems interconnected by a local network, and a network regulator protecting the client systems against computers security threats according to some embodiments of the present invention.

FIG. 1-B shows alternative configuration of client systems and network regulator according to some embodiments of the present invention.

FIG. 19-A illustrates an embodiment of the present invention, wherein a part of a network traffic is scanned at the security server according to some embodiments of the present invention.

FIG. 19-B shows an embodiment of the present invention, wherein a part of a network traffic is scanned by the network regulator according to some embodiments of the present invention.

DETAILED DESCRIPTION OF PREFERRED EMBODIMENTS

Figure 2:
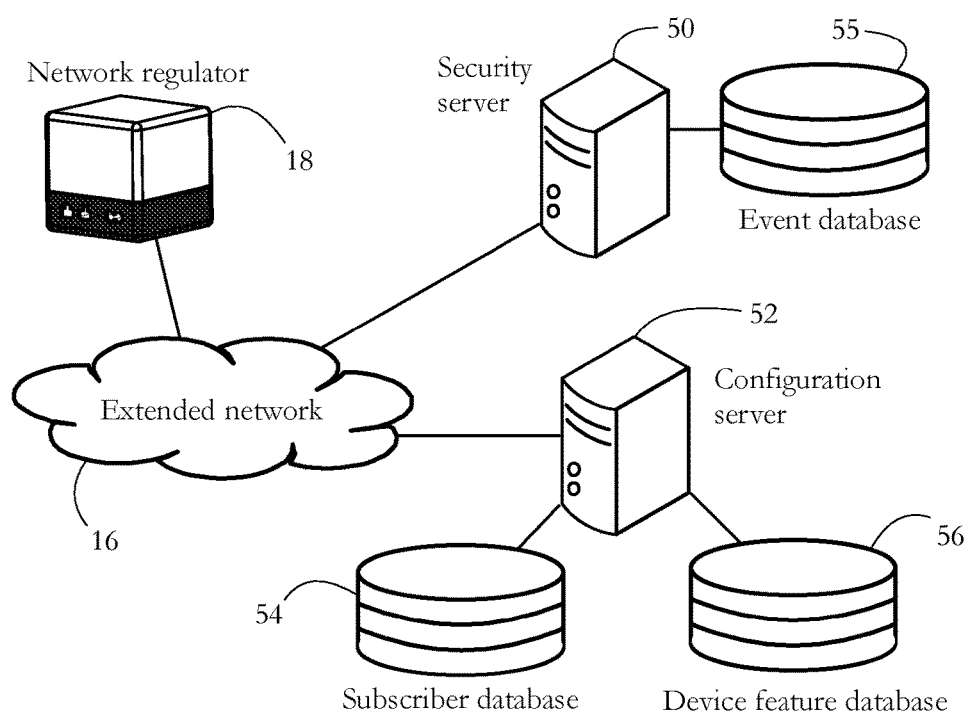
FIG. 2 shows a set of remote servers collaborating with the network regulator according to some embodiments of the present invention.

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer security encompasses protecting users and equipment against unintended or unauthorized access to data and/or hardware, against unintended or unauthorized modification of data and/or hardware, and against destruction of data and/or hardware. A computer program is a sequence of processor instructions carrying out a task. Computer programs described in some embodiments of the present invention may be stand-alone software entities or sub-entities (e.g., subroutines, libraries) of other computer programs. Two devices are said to be connected to or to belong to the same local network when their network addresses belong to the same subnet and/or when both have the same broadcast address. A tunnel is a virtual point-to-point connection between two entities connected to a communication network. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more microprocessors) programmed to perform the methods described herein, as well as computer-readable media encoding instructions to perform the methods described herein.

The following description illustrates embodiments of the invention by way of example and not necessarily by way of limitation:

FIGS. 1-A-B show exemplary network configurations 10a-b according to some embodiments of the present invention, wherein a plurality of client systems 12a-f are interconnected by a local network 14, and further connected to an extended network 16, such as the Internet. Client systems 12a-f may represent any electronic device having a processor, a memory, and a communication interface. Exemplary client systems 12a-f include personal computers, laptops, tablet computers, mobile telecommunication devices (e.g., smartphones), media players, TVs, game consoles, home appliances (e.g., refrigerators, thermostats, intelligent heating and/or lighting systems), and wearable devices (e.g., smartwatches, sports and fitness equipment), among others. Local network 14 may comprise a local area network (LAN). Exemplary local networks 14 may include a home network and a corporate network, among others.

Router 19 comprises an electronic device enabling communication between client systems 12a-f and/or access of client systems 12a-f to extended network 16. In some embodiments, router 19 acts as a gateway between local network 14 and extended network 16, and provides a set of network services to client systems 12a-f. Unless otherwise specified, the term network services is used herein to denote services enabling the inter-communication of client systems 12a-f, as well as communication between client systems 12a-f and other entities. Such services may include, for instance, distributing network configuration parameters (e.g., network addresses) to clients systems 12a-f, and routing communication between participating endpoints. Exemplary network services implement a dynamic host configuration protocol (DHCP).

FIGS. 1-A-B further show a network regulator 18 connected to local network 14. In some embodiments, network regulator 18 comprises a network appliance configured to perform various services for client systems 12a-f. Such services include, among others, computer security services (e.g., anti-malware, intrusion detection, anti-spyware, etc.), device management (e.g., remote configuration of client systems 12a-f), parental control services, secure communication services (e.g., virtual private networking—VPN), and remote technical assistance (e.g., device and/or network troubleshooting).

In a typical application according to some embodiments of the present invention, network regulator 18 is introduced to a local network already configured and managed by router 19. In some embodiments, at installation, regulator 18 takes over network services such as DHCP from router 19 and installs itself in a gateway position between local network 14 and extended network 16, so that at least a part of the traffic between client systems 12a-f and extended network 16 traverses network regulator 18 (see FIG. 1-A). Placing network regulator 18 in a gateway position may be preferable because, in some embodiments, regulator 18 provides computer security services by redirecting at least some of the traffic (e.g., HTTP requests) from client systems 12a-f to a security server. Having regulator 18 in a gateway position may facilitate the interception of such traffic.

In some embodiments such as the example in FIG. 1-B, router 19 may continue to operate as gateway for local network 14 after installation of regulator 18, but in such cases network regulator 18 is preferably positioned between client systems 12a-f and the existing gateway (i.e., router 19), so that regulator 18 belongs to the same local network as client systems 12a-f. Such a position is preferred because, in some embodiments, network regulator 18 is configured to collaborate with a remote server to detect the type of each client system (e.g., smartphone vs. PC), and in response, to deliver a device-specific utility agent to some of client systems 12a-f. Configurations wherein regulator 18 is not a member of local network 14 (e.g., placing regulator 18 between router 19 and extended network 16) may make such device discovery and agent delivery more difficult.

In some embodiments, client systems 12a-f are monitored, managed, and/or configured remotely by a user/administrator, using software executing on an administration device 20 connected to extended network 16 (e.g., the Internet). Exemplary administration devices 20 include smartphones and personal computer systems, among others. Device 20 may expose a graphical user interface (GUI) allowing a user to remotely configure and/or manage operation of client systems 12a-f, for instance to set configuration options and/or to receive notifications about events occurring on the respective client systems.

In some embodiments, network regulator 18 may collaborate with a set of remote computer systems in order to perform various services for client systems 12a-f. Exemplary remote computer systems include a security server 50 and a configuration server 52, illustrated in FIG. 2. Servers 50 and 52 may comprise individual machines, or clusters of multiple interconnected computer systems. In some embodiments, network regulator 18 redirects some or all of the traffic coming to and/or from client systems 12a-f to security server 50. Server 50 may then perform threat detection operations (e.g., malware detection, blocking access to malicious or fraudulent websites, intrusion prevention, etc.), to protect client systems 12a-f against computer security threats. Security server 50 may be further connected to an event database 55 comprising a plurality of security records, each security record including data indicative of a security event, as well as an indicator of an association between the respective event and a protected client system.

One advantage of routing traffic to/from a protected client system through security server 50 is that it allows the respective client system to leave local network 14, while still benefitting from protection. Such configurations are described in full detail below.

In some embodiments, configuration server 52 collaborates with administration device 20 to configure device management and/or security settings of regulator 18, router 19, and/or of a protected client system 12. Server 52 may be communicatively connected to a subscriber database 54 and to a device feature database 56. Subscriber database 54 may store a plurality of subscription records, each subscription record indicative of a set of client systems under device management according to some embodiments of the present invention. In one embodiment, each subscription record is uniquely associated with a distinct network regulator 18. In such embodiments, all client systems 12 configured and/or otherwise serviced using the respective network regulator (e.g., client systems 12a-f connected to local network 14 in FIG. 1-A) are associated with the same subscription record. Each subscription record may include an indicator of a subscription period and/or a set of subscription parameters describing, for instance, a desired level of security or a selection of services subscribed for. Subscriptions may be managed according to a service-level agreement (SLA).

In some embodiments, device feature database 56 comprises a set of records indicating configurable features of each client system 12 and/or current configuration settings for each client system. Database 56 may further comprise a comprehensive set of records usable to determine a device type of client system 12. Such records may include entries corresponding to various device types (e.g., routers, smartphones, wearable devices, etc.), makes, and models, from various manufacturers, using various operating systems (e.g., Windows® vs. Linux®). An exemplary entry may comprise, among others, indicators of whether the respective device type uses a particular network protocol to communicate (e.g., HTTP, Bonjour®), an indicator of a layout of a login interface exposed by the respective device type, etc.

Figure 3:
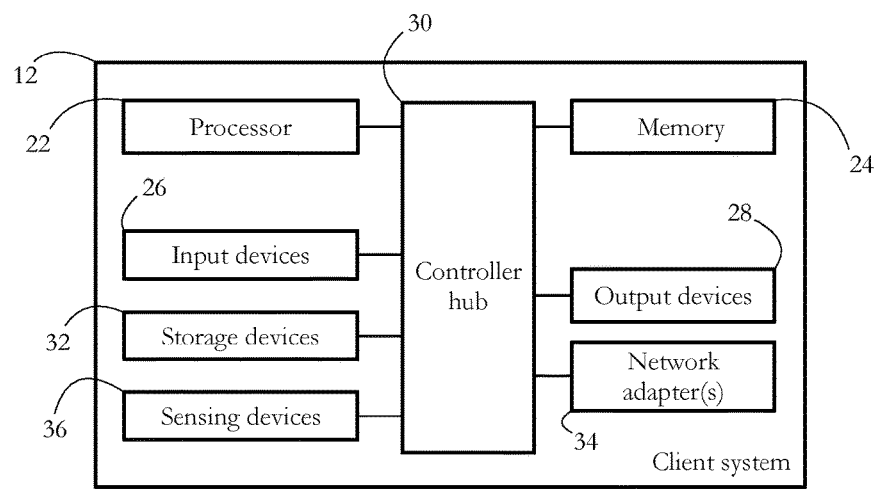
FIG. 3 illustrates an exemplary hardware configuration of a client system according to some embodiments of the present invention.
Figure 4:
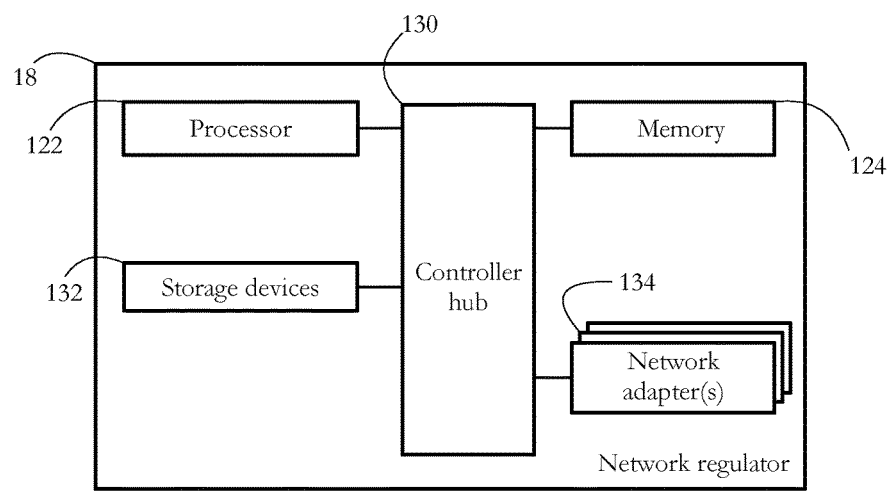
FIG. 4 illustrates an exemplary hardware configuration of a network regulator according to some embodiments of the present invention.
Figure 5:
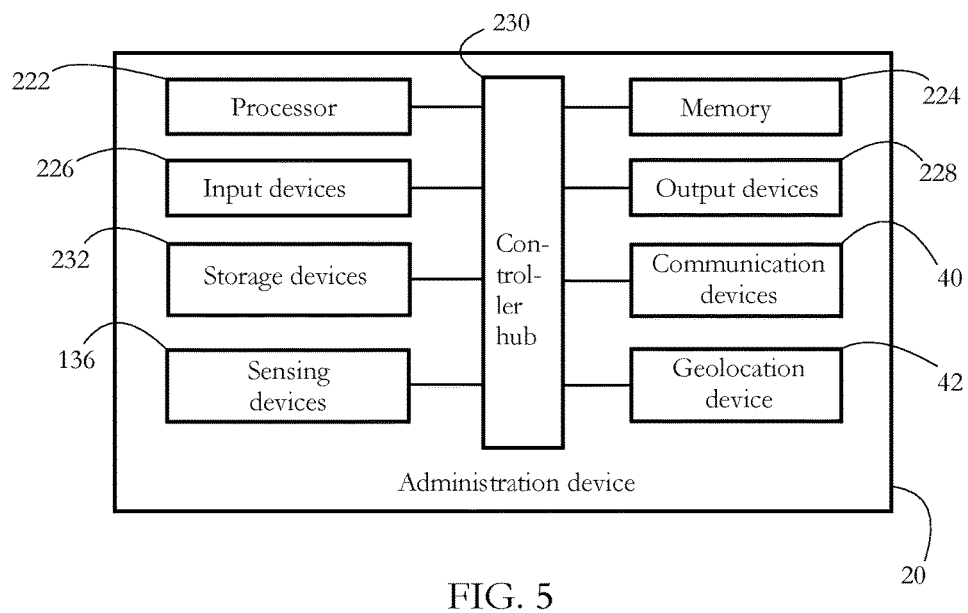
FIG. 5 illustrates an exemplary hardware configuration of an administration device according to some embodiments of the present invention.

FIGS. 3-4-5 show exemplary hardware configurations of client system 12, network regulator 18, and administration device 20, respectively. Without loss of generality, the illustrated configurations correspond to computer systems (FIGS. 3-4) and a smartphone (FIG. 5). The hardware configuration of other systems (e.g., tablet computers) may differ from the ones illustrated in FIGS. 3-4-5. Each of processors 22, 122, and 222 comprises a physical device (e.g. microprocessor, multi-core integrated circuit formed on a semiconductor substrate) configured to execute computational and/or logical operations with a set of signals and/or data. Memory units 24, 124, and 224 may comprise volatile computer-readable media (e.g. RAM) storing data/signals accessed or generated by processors 22, 122, and 222, respectively, in the course of carrying out operations.

Input devices 26, 226 may include computer keyboards, mice, and microphones, among others, including the respective hardware interfaces and/or adapters allowing a user to introduce data and/or instructions into the respective system. Output devices 28, 228 may include display devices such as monitors and speakers among others, as well as hardware interfaces/adapters such as graphic cards, allowing the respective system to communicate data to a user. In some embodiments, input and output devices share a common piece of hardware (e.g., touch-screen). Storage devices 32, 132, and 232 include computer-readable media enabling the non-volatile storage, reading, and writing of software instructions and/or data. Exemplary storage devices include magnetic and optical disks and flash memory devices, as well as removable media such as CD and/or DVD disks and drives.

Network adapters 34, 134 enable client system 12 and network regulator 18, respectively, to connect to an electronic communication network such as local network 14, and/or to other devices/computer systems. Communication devices 40 (FIG. 5) enable administration device 20 to connect to extended network 16 (e.g., the Internet), and may include telecommunication hardware (electromagnetic wave emitters/receivers, antenna, etc.). Depending on device type and configuration, administration device 20 may further include a geolocation device 42 (e.g. GPS receiver), and a set of sensing devices 136 (e.g., motion sensors, light sensors, etc.).

Controller hubs 30, 130, 230 represent the plurality of system, peripheral, and/or chipset buses, and/or all other circuitry enabling the communication between the processor of each respective system and the rest of the hardware components. In an exemplary client system 12 (FIG. 3), hub 30 may comprise a memory controller, an input/output (I/O) controller, and an interrupt controller. Depending on hardware manufacturer, some such controllers may be incorporated into a single integrated circuit, and/or may be integrated with the processor.

Figure 6:
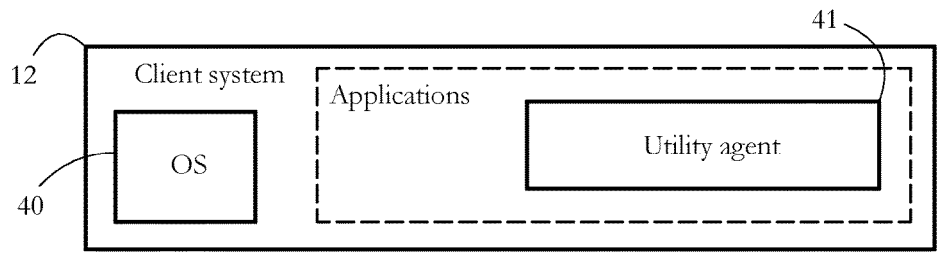
FIG. 6 shows a set of exemplary software components executing on a protected client system according to some embodiments of the present invention.

FIG. 6 shows exemplary software components executing on client system 12 according to some embodiments of the present invention. Such software may include an operating system (OS) 40 providing an interface between the hardware of client system 12 and a set of software applications executing on the respective client system. Software applications include a utility agent 41 configured to provide various services to the respective client system, such as security services, device management services, parental control services, secure communication services (e.g., virtual private networking—VPN), etc. In some embodiments, utility agent 41 is configured to access and/or modify a set of configuration options of client system 12 (e.g., network configuration parameters, power management parameters, security parameters, device-specific parameters such as a desired temperature in the case of a remotely controlled thermostat, or a selection of lights in the case of a remotely controlled home lighting manager, etc.). In some embodiments, the installation of agent 41 on client system 12 is initiated and/or facilitated by network regulator 18, as shown in more detail below.

Figure 7:
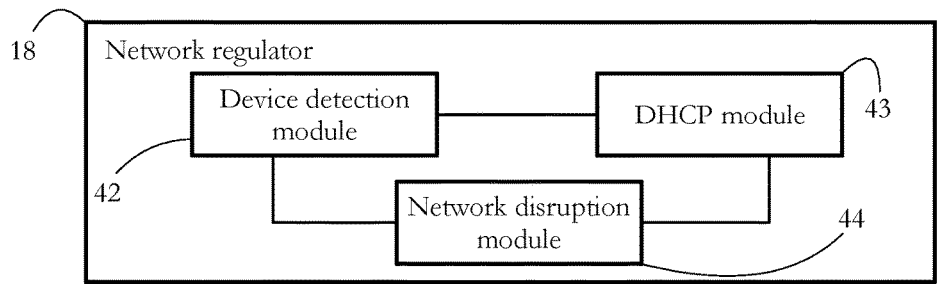
FIG. 7 shows an exemplary set of software components executing on the network regulator according to some embodiments of the present invention.

FIG. 7 shows a set of software components executing on network regulator 18 according to some embodiments of the present invention. Such components may include, among others, a device detection module 42 and a DHCP module 43. In some embodiments, module 43 provides DHCP services for local network 14. Such services may include delivering Internet protocol (IP) configuration information to clients requesting access to local network 14 and/or to extended network 16. Device detection module 42 may be configured to collaborate with a remote configuration server to detect a device type of client system 12, as shown below.

In some embodiments, regulator 18 further executes a network disruption module 44 configured to perform a network service takeover as shown in detail below.

Figure 8:
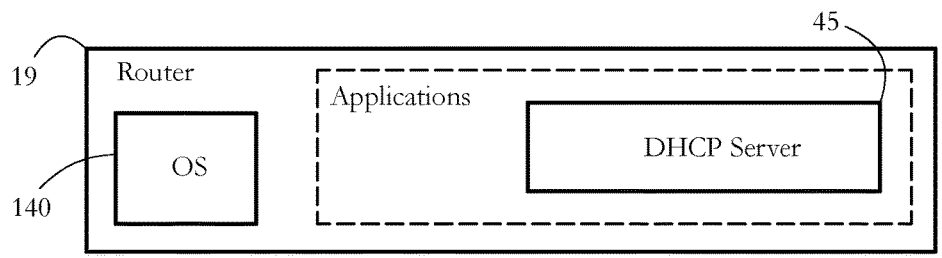
FIG. 8 illustrates exemplary software executing on the router according to some embodiments of the present invention.

FIG. 8 shows an exemplary set of software components executing on router 19, according to some embodiments of the present innovation. Such software components may include an operating system 140 and a set of applications, which include a DHCP server 45. Server 45 may be used to distribute network configuration parameters (e.g., IP addresses) to client systems 12a-f, in order to set up local network 14.

Figure 9:
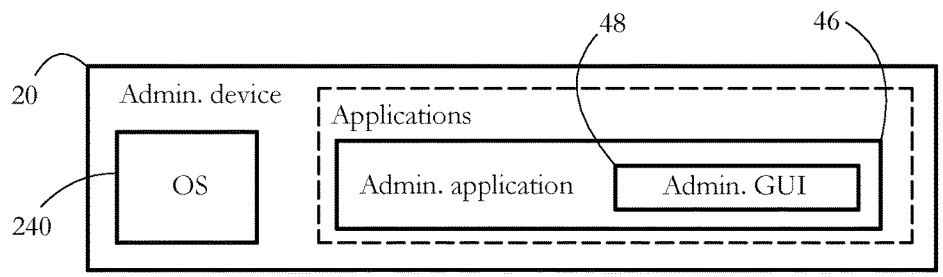
FIG. 9 shows exemplary software executing on the administration device according to some embodiments of the present invention.

FIG. 9 shows an exemplary set of software components executing on administration device 20 (e.g., a smartphone), according to some embodiments of the present invention. Such software components may include an operating system 240 and a set of applications. Applications include an administration application 46 configured to enable a user to remotely configure client systems 12a-f. Configuring systems 12a-f may include, among others, configuring client-specific security settings, configuring client-specific network access parameters (e.g., connection speed, etc.) and launching maintenance tasks (e.g., software upgrades, disk cleanup operations, etc.). Administration application 46 may expose an administration graphical user interface (GUI) 48 to a user of administration device 20.

Figure 10:
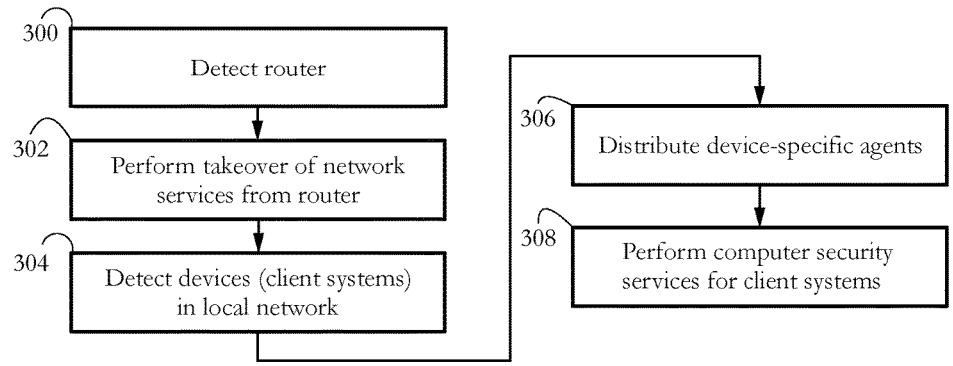
FIG. 10 shows an exemplary sequence of steps executed by the network regulator according to some embodiments of the present invention.

FIG. 10 shows a sequence of steps executed by network regulator 18 according to some embodiments of the present invention. Such a sequence may be executed, for instance, upon installation of network regulator 18, or when regulator 18 is first introduced to local network 14. In a step 300, regulator 18 automatically detects router 19, herein representing the existing provider of network services. In some embodiments, regulator 18 then takes over some of the network services from router 19. Such takeover may comprise shutting off or otherwise incapacitating some of the functionality of router 19, and replacing router 19 as the provider of at least a part of the network services associated with local network 14. In an alternative embodiment, service takeover may comprise offering an alternative set of network services in addition to those managed by router 19, without actually incapacitating the latter. In some embodiments, step 302 further comprises installing network regulator 18 in a gateway position between local network 14 and extended network 16, so that at least a part of network traffic between client systems 12a-f and extended network 16 traverses regulator 18.

In a sequence of steps 304-306, network regulator 18 may automatically detect devices belonging to local network 14 (i.e., client systems 12a-f), and distribute device-specific utility agents 41 to at least some of client systems 12a-f. A further step 308 performs a set of computer security services for client systems 12a-f. Steps 300-308 are described in further detail below.

Network Service Takeover

In some embodiments of the present invention, DHCP services of router 19 may be turned off or otherwise incapacitated by network regulator 18. This effect can be obtained through several methods, some of which are exemplified below. DHCP services are used herein just as an example; the systems and methods described below may be adapted to take over other network services.

In one exemplary scenario, known as DHCP starvation, network regulator 18 may use network disruption module 44 to impersonate a plurality of fictitious devices and to request network addresses for each fictitious device from router 19.

The count of such fictitious devices may be chosen so as to completely occupy the available pool of IP addresses offered for lease by DHCP server 45 of router 19. In this manner, although server 45 continues to operate, server 45 is no longer able to provide IP addresses to client systems on local network 14. In some embodiments, network regulator 18 may then use DHCP module 43 to broadcast its own DHCP lease offer, effectively forcing client systems 12*a-f* to use regulator 18 as the default DHCP server and gateway device for at least part of the traffic between client systems 12*a-f* and extended network 16.

Figure 11:
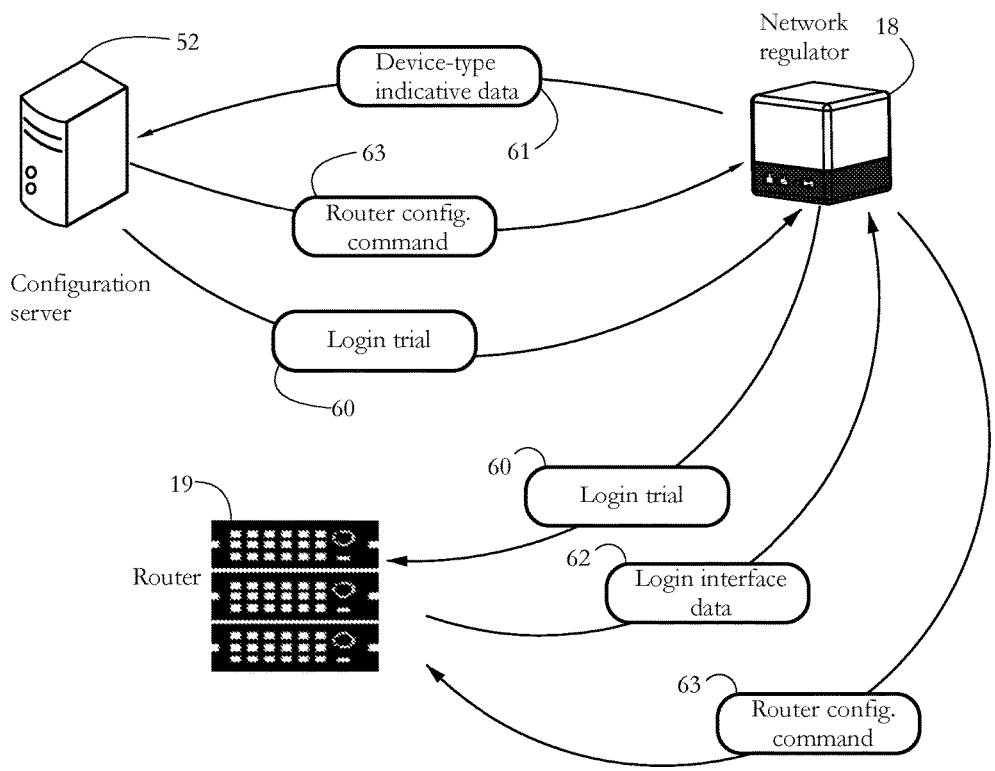
FIG. 11 shows an exemplary data exchange between the router, the network regulator, and the configuration server, performed during a network service takeover procedure according to some embodiments of the present invention.

Another exemplary set of methods of DHCP service takeover comprise automatically detecting an existing DHCP service provider (e.g., router 19) and disabling the respective device, for instance by automatically re-configuring its network and/or other functional parameters. One such scenario involves network regulator 18 collaborating with configuration server 52 in a manner illustrated in FIGS. 11-12.

In some embodiments, a step 320 requests and then receives permission from a user to re-configure router 19. The respective user may be an owner or administrator of regulator 18 and/or of local network 14, as listed, for instance, in subscriber database 54 maintained by configuration server 52 (see FIG. 2). Obtaining permission may include, for instance, sending a notification to administration device 20, which may be done by regulator 18 or configuration server 52. Administration GUI 48 of device 20 may then expose an input field allowing the user to indicate whether he/she allows re-configuring parameters of router 19. Step 320 may further include obtaining login credentials (e.g., username, password, etc.) for router 19, either directly from the user via administration device 20, or from a subscription record stored in database 54.

In a step 322, network regulator 18 gathers device-type indicative information about router 19, for instance by analyzing data received from router 19 during a DHCP request/response exchange. Such data may include, among others, a media access control (MAC) address of router 19 and an authentication header. In some embodiments, network regulator 18 may further attempt to expose a login interface of router 19, and further extract device-type-indicative data from the respective interface (for instance, determine whether the interface is a HTML document or not, and determine a network address of the respective interface). Some embodiments of regulator 18 may even extract certain visual features of the respective interface, for instance by using an image-processing algorithm.

Device-type indicative data 61 is then sent to configuration server 52 (step 324), which may identify a device type of router 19 (e.g. manufacturer, model, family, subfamily, firmware version, etc.) according to such data and/or according to data stored in device feature database 56 (FIG. 2). Configuration server 52 may then configure a login trial 60 tailored for the particular device type of router 19 according to device-type-indicative data received from regulator 18, and may transmit login trial data to regulator 18.

In some embodiments, network regulator 18 may repeat a loop of steps 326-334 in an iterative trial-and-error attempt to log into router 19. Steps 328-330 may expose the login interface of router 19 and transmit login trial data 60 and/or user credentials to router 19. An indicator of whether login was successful is sent back to server 52 (step 332); the success indicator may be used to further identify a device type of router 19.

Once a successful login was achieved, in a step 336, network regulator 18 may obtain a set of router configuration commands 63 from configuration server 52, commands 63 crafted specifically according to the identified type of router and aimed at incapacitating router 19, or at least some network services offered by router 19. Exemplary router configuration commands 63 may instruct router 19 to shut down, to restart, to expose a configuration interface, and to change a configuration setting, among others. Another exemplary configuration command 63 comprises a HTTP request configured to expose a configuration interface of router 19. In some embodiments, commands 63 may automatically fill in a set of fields of the exposed interface. In some embodiments, commands 63 comprise a set of parameter values for filling in a set of fields of a configuration interface of router 19.

In a step 338, network regulator 18 may transmit configuration commands 63 to router 19. To complete the takeover of DHCP services from router 19, regulator 18 may employ DHCP module 43 (FIG. 7) to broadcast its own DHCP lease offer to client systems 12*a-f*.

In some embodiments, network regulator 18 may transmit another set of commands to router 19 in the event when the owner/administrator of regulator 18 decides to uninstall regulator 18. In one such example, regulator 18 may instruct router 19 to revert to settings, which were effective before installation of network regulator 18.

Figure 12:
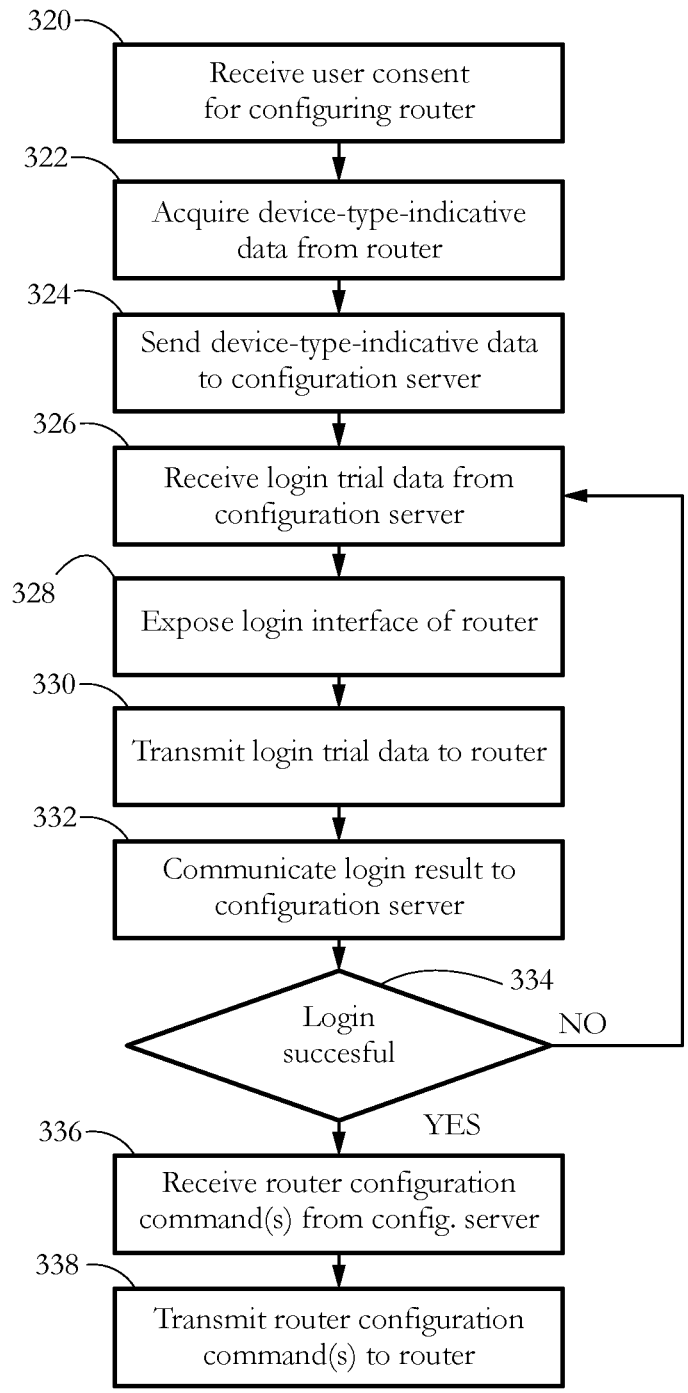
FIG. 12 shows an exemplary sequence of steps performed by the network regulator during a network service takeover procedure, according to some embodiments of the present invention.
Figure 13:
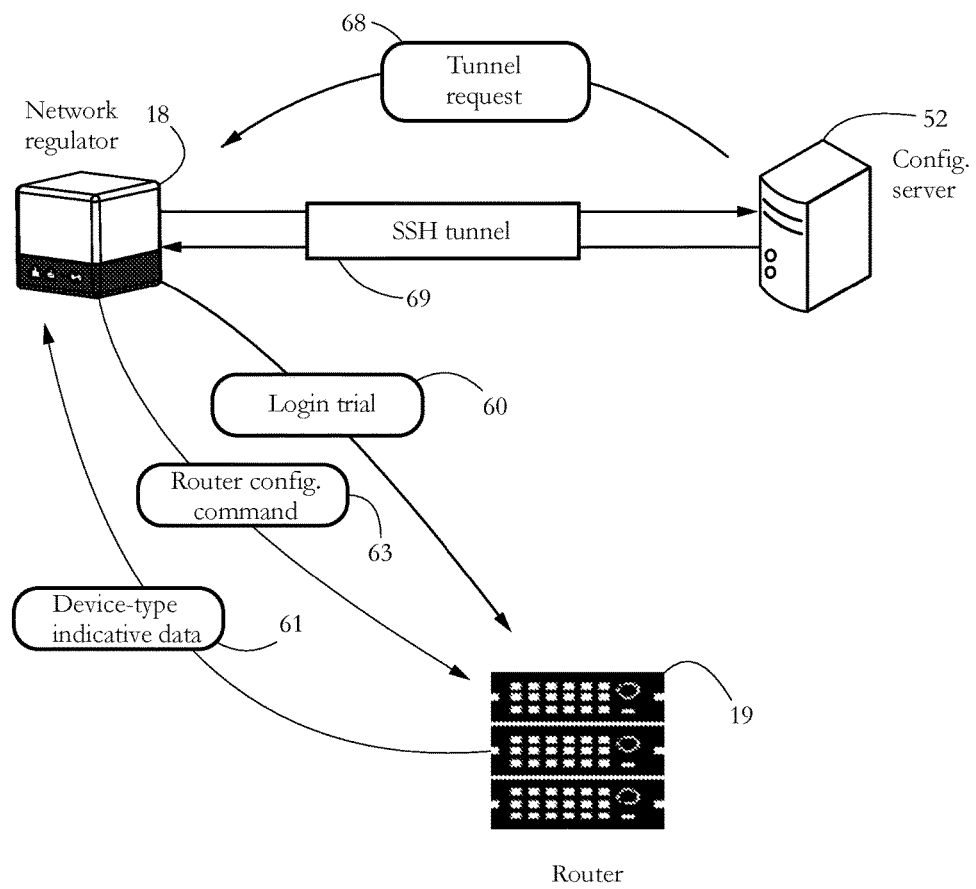
FIG. 13 shows an alternative data exchange performed during a network service takeover according to some embodiments of the present invention.
Figure 14:
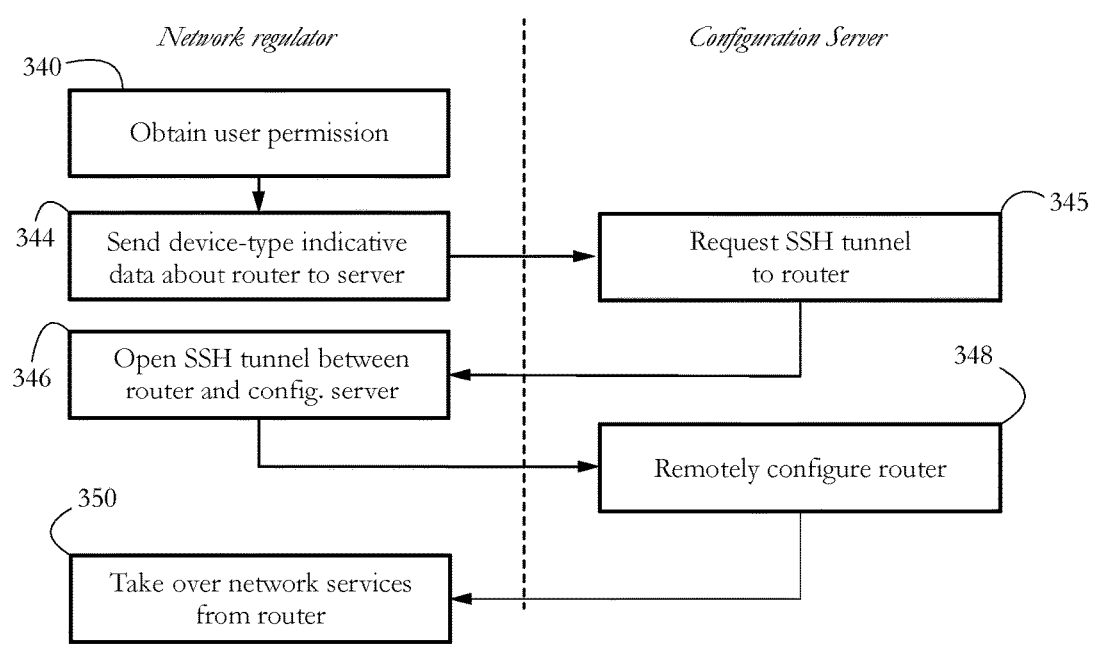
FIG. 14 shows an exemplary sequence of steps performed by the network regulator in collaboration with the configuration server to carry out a network service takeover according to some embodiments of the present invention.

FIGS. 13-14 illustrate an alternative method of network service takeover by network regulator 18 according to some embodiments of the present invention. The illustrated method comprises a variation to the method described above in relation to FIGS. 11-12. Instead of employing network regulator 18 to actively re-configure network settings and/or to (partially) disable router 19, in the method illustrated in FIGS. 13-14, such actions are performed directly by configuration server 52, while regulator 18 is used as a proxy or relay. Some embodiments conduct remote configuration of router 19 using tunnels, i.e., point-to-point secure connections/communication channels.

In response to installation within local network 14, network regulator 18 may transmit a registration message to servers 50-52, including unique identifying indicators for the respective network regulator, router 19, and client systems connected to the respective local network. Thus, servers 50-52 may selectively identify each individual device and associate each client system 12 and router 19 with a subscription and/or with a respective network regulator. This process of registration with configuration server 52 allows server 52 to accept tunnel connections from regulator 18.

In response to obtaining permission from the user to re-configure the local network (step 340), network regulator 18 may open a communication tunnel 69 connecting regulator 18 to server 52. An exemplary tunnel comprises a secure shell (SSH) tunnel, i.e., a tunnel set up using a version of the SSH protocol. In some embodiments, network regulator 18 employs a port forwarding strategy to redirect network traffic received via tunnel 69 onto router 19, and/or redirect communications received from router 19 onto server 52 via tunnel 69. Such port forwarding may be achieved using any method known in the art of networking, for instance using proxying, a SOCKS client, network address translation (NAT), etc.

By using port forwarding, some embodiments of configuration server 52 may thus remotely configure router 19 via tunnel 69. Such remote configuration may include some of the operations described above in relation to FIGS. 11-12, such as determining a device type of router 19, sending configuration commands to router 19, etc.

In response to determining a device type of router 19, server 52 may send a tunnel request 68 to regulator 18, the tunnel request instructing network regulator 18 to set up tunnel 69 (step 346). The tunnel may be configured with port forwarding, so that a communication sent by server 52 to regulator 18 will be forwarded onto router 19. In a step 348, server 52 may then transmit login data and/or router configuration commands over tunnel 69 to instruct router 19 to disable or otherwise re-configure DHCP services of router 19.

Figure 15:
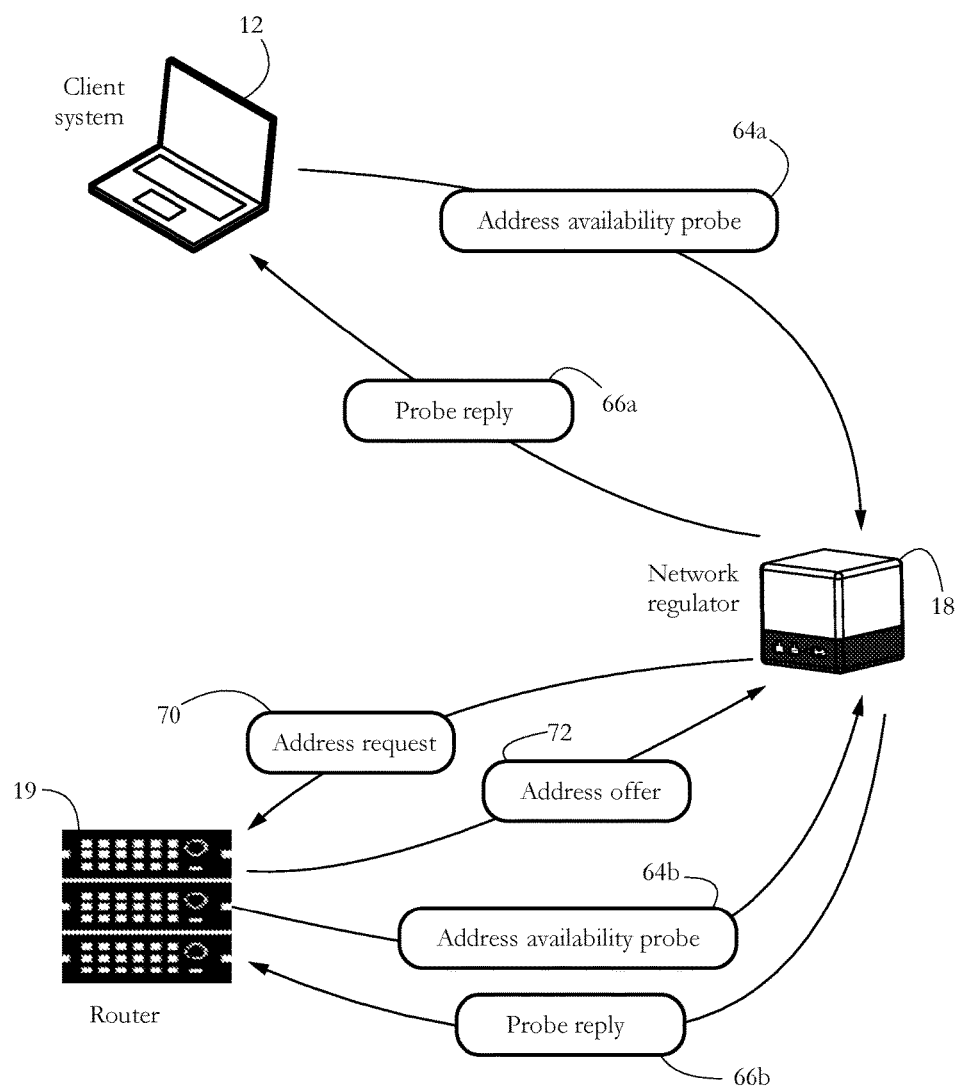
FIG. 15 shows a data exchange between the router, the network regulator, and a client system, performed during another example of network service takeover procedure according to some embodiments of the present invention.
Figure 16:
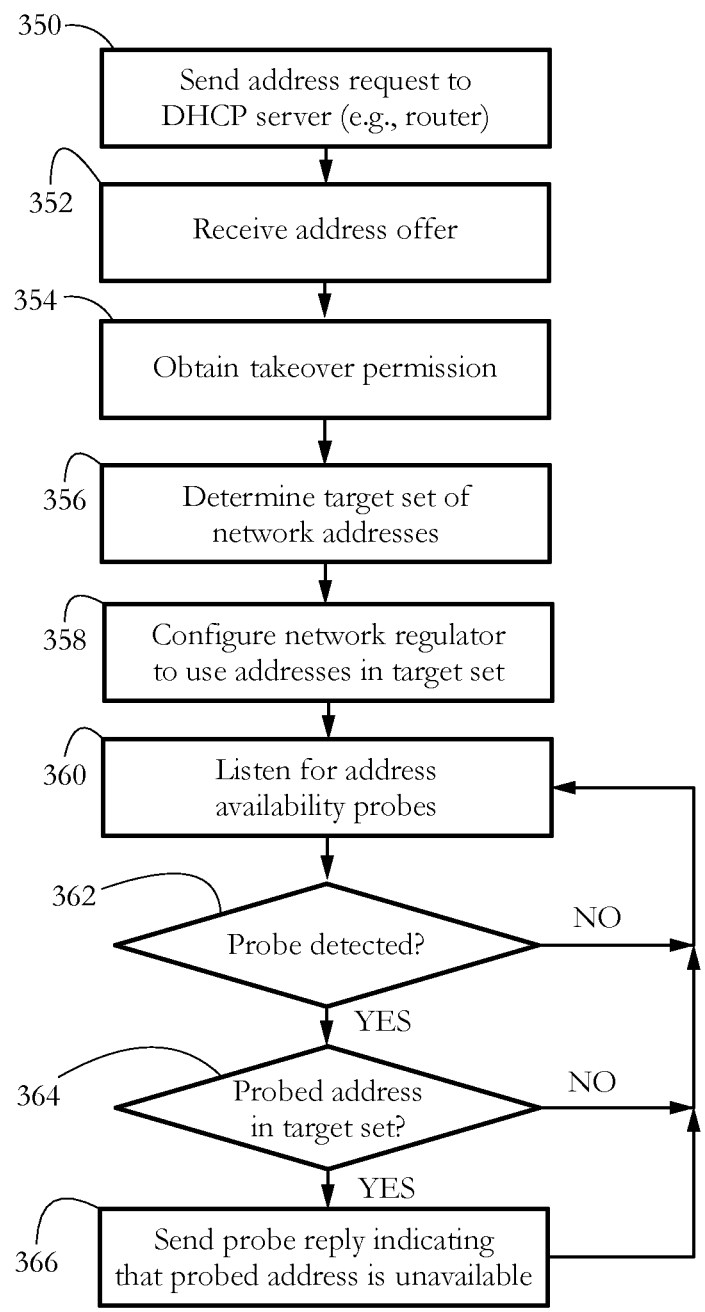
FIG. 16 shows another exemplary sequence of steps performed by the network regulator during a network service takeover procedure, according to some embodiments of the present invention.

FIGS. 15-16 illustrate yet another method of taking over network services from router 19 according to some embodiments of the present invention. When introduced to local network 14, regulator 18 may send an address request 70 to the current network service provider (e.g., router 19), requesting a network address (step 350). In response, router 19 may return an address offer 72 to regulator 18. Request 70 and return 72 may form part of a standard address assignment protocol, for instance, DHCP. Step 352 may further comprise accepting address offer 72 and configuring network regulator 18 to use the respective network address and/or other network parameters (e.g., gateway, DNS server, etc.).

Next, in a step 354, regulator 18 may obtain permission of a human operator to perform the network service takeover procedure (see above, in relation to FIG. 12). In response to obtaining permission, in a step 356, network regulator 18 may determine a target set of network addresses according to parameters of the previously received address offer 72. In some embodiments using DHCP, offer 72 comprises an indicator of a pool of addresses (e.g., a range of address values) managed by and/or available for assignment by the current network service provider. Regulator 18 may select the target set of network addresses from the respective pool of addresses. In some embodiments, the target set includes all addresses of the pool. In other embodiments, the target set includes all addresses of the pool, except the address currently assigned to router 19.

A step 358 may configure network regulator 18 to use all addresses of the target set. In some embodiments, step 358 comprises creating a set of fictitious devices (aliases), and assigning a subset of the target set of network addresses to each such fictitious device. Next, in a sequence of steps 360-366, network regulator 18 may exploit an address conflict detection (ACD) mechanism to progressively force clients 12a-f to relinquish their currently assigned network addresses. In the meantime, regulator 18 may use DHCP module 36 to offer a new set of network addresses and/or other configuration parameters to client systems 12a-f, thus completing the network service takeover procedure.

An exemplary ACD mechanism is described in the IPv4 Address Conflict Detection Request for Comments (RFC5227) issued by the Network Working Group of Apple®, Inc., in July 2008. The described ACD mechanism requires that, as part of network address assignment (occurring, for instance, upon the initial offer to lease a network address, or upon lease renewal for the respective network address), each client and/or their respective network service provider verify whether the respective network address is available, i.e., not already in use by another device. Such verifications may use tools and/or mechanisms described in the Address Resolution Protocol (ARP) and Neighbor Discovery Protocol (NDP), among others. An exemplary verification comprises the respective client and/or provider sending out a probe (e.g., a specially configured network packet, a ping, an arping, etc.) to the network address currently being verified. When the client and/or provider that sent out the probe receives no reply to the respective probe, the respective address is considered available and may be (re)assigned to the respective client. In contrast, when client and/or provider receives a reply to the respective probe, the respective address is considered to be taken and is no longer (re)assigned to the respective client.

The ACD mechanism described above is exploited by some embodiments of network regulator 18 for takeover purposes, as shown in FIGS. 15-16. In a sequence of steps 360-362, regulator 18 may listen for address availability probes 64a-b, issued by client system 12 and/or router 19, respectively. In response to detecting such a probe, a step 364 determines whether the probed address matches any member of the target set of network addresses determined in step 356. When no, regulator 18 returns to listening for address availability probes.

When the probed address matches a member of the target set of addresses, in a step 366, regulator 18 may return a probe reply 66a-b to the sender of the respective probe, the probe reply configured to indicate that the respective network address is not available. In some embodiments, step 366 comprises a fictitious device (alias) created by network regulator 18 issuing a probe reply configured with the details of the respective fictitious device. When client system 12 is configured to support conflict detection, receiving such a return probe may determine client system 12 to stop using the respective network address and request a new address. Such new requests will fail for all addresses in the target set of addresses, because they will trigger a re-run of steps 360-366. By repeating the sequence of steps 360-366 for each client system 12a-f, network regulator 18 may thus progressively disable network services offered by router 19 and force client systems 12a-f to use a new set of network addresses issued by regulator 18.

Automatic Device Discovery and Agent Provisioning

Figure 17:
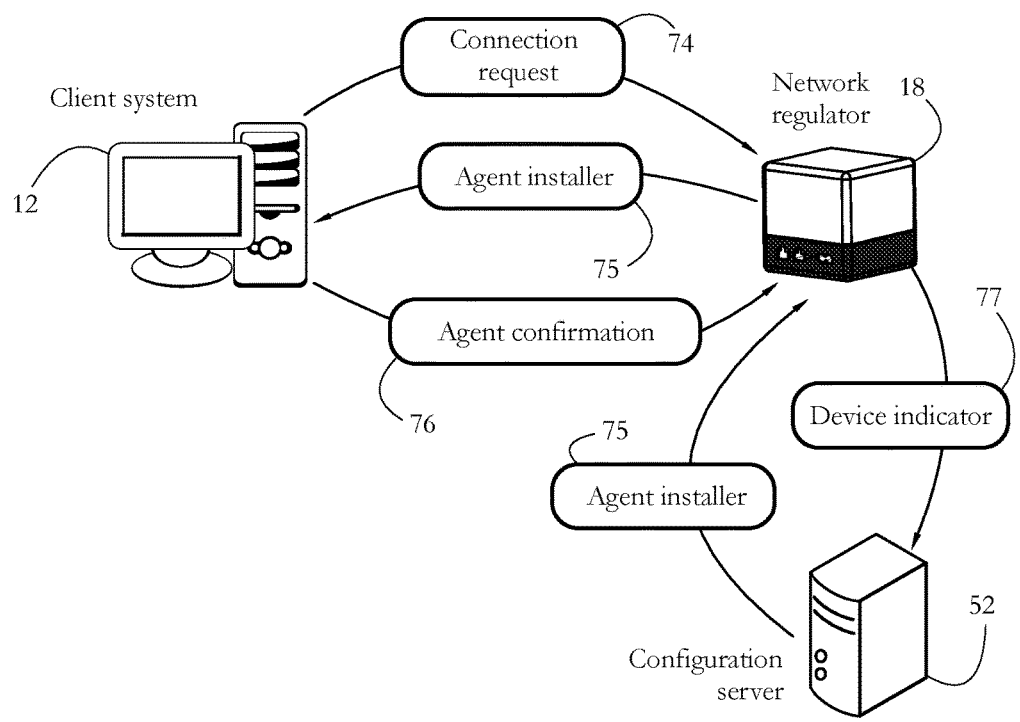
FIG. 17 illustrates an exemplary data exchange between a client system, the network regulator and the configuration server, as part of device-specific agent installation.

Having installed itself as gateway and/or provider of network services for local network 14, network regulator 18 may proceed to distribute utility agents 41 (e.g., FIG. 6) to client systems 12a-f connected to local network 14. FIG. 17 shows an exemplary data exchange between client system 12, network regulator 18, and client configuration server 52 according to some embodiments of the present invention, the exchange occurring during device discovery and agent provisioning. Such exchanges may occur upon installation of network regulator 18, as well as when a new client system is first introduced to local network 14.

Figure 18:
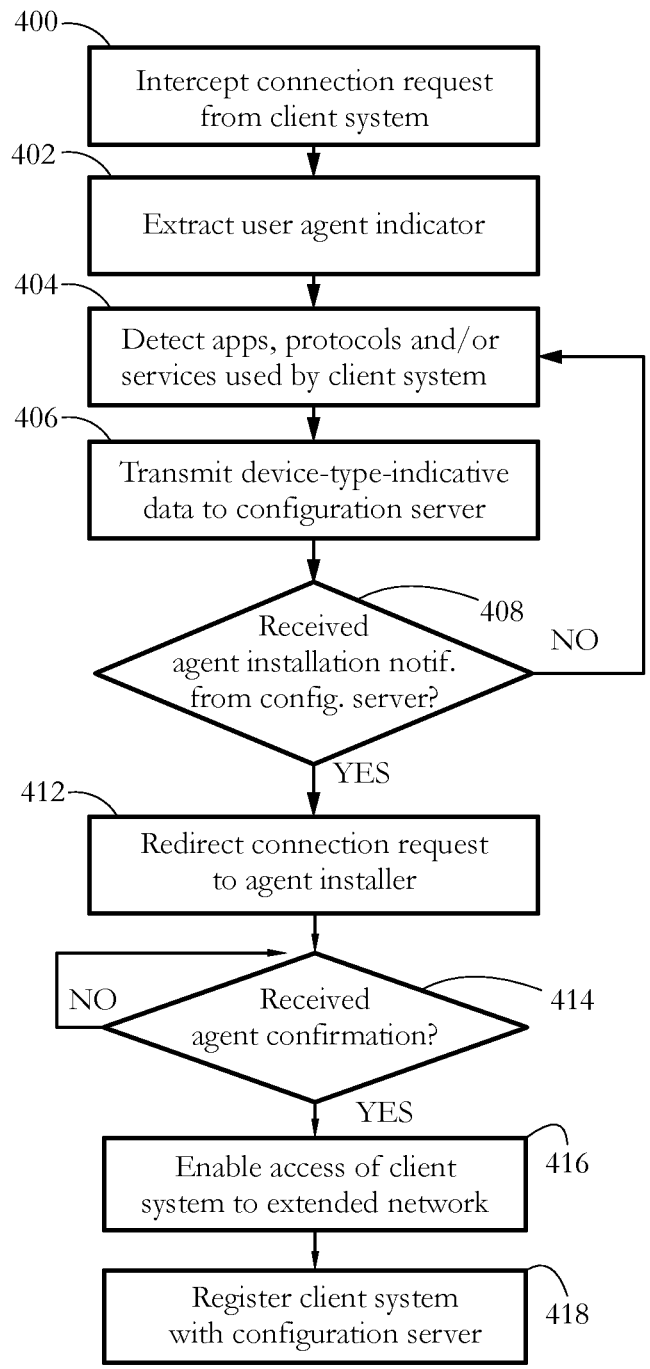
FIG. 18 illustrates an exemplary sequence of steps performed by the network regulator during an agent installation procedure, according to some embodiments of the present invention.

An exemplary sequence of steps performed by network regulator 18 to deliver a device-specific utility agent is illustrated in FIG. 18. In some embodiments, regulator 18 may wait for connection requests from local client systems (step 400). An exemplary connection request comprises a HTTP request. When client system 12 attempts to access an address on extended network 16, regulator 18 may force the respective client system to install utility agent 41. In some embodiments, regulator 18 may redirect the current network access request to configuration server 52, which may serve an agent installer 75 to the respective client system (FIG. 17). In an alternative embodiment, regulator 18 may obtain agent installer 75 from server 52, and then push installer 75 to the respective client system.

In some embodiments, installer 75 is configured to determine client system 12 (or administration device 20) to expose a confirmation interface to a user, requesting the user to agree to install agent 41. Installer 75 may further request the user to confirm that the user agrees with terms of the respective subscription (e.g. as listed in a SLA). When the user indicates agreement, installer 75 may install and execute agent 41. In some embodiments, installer 75 and/or network regulator 18 may register the respective client system with client configuration server 52 (step 418 in FIG. 18). Such registration may include server 52 associating the respective client system with a subscription record attached to network regulator 18.

Considering the great diversity of devices currently being connected to communication networks and the Internet, it may be preferable that utility agents 41 delivered to protected client systems 12*a-f* be tailored to the device type of each client system (e.g., smartphone, tablet, smartwatch, running Windows® OS or iOS®, etc.). Exemplary steps 400-406 (FIG. 18) illustrate an exemplary method of determining a device type of client system 12. Network regulator 18 may obtain device-type-indicative data by extracting a user agent indicator from a HTTP request (the user agent indicator typically contains information about both the browser type and operating system of the HTTP request sender). Regulator 18 may further detect a set of applications, protocols and/or services used by the respective client systems, for instance by scanning for the respective services and/or protocols (step 404). Such scanning may include sending a probe out to a particular port of the respective client system, and listen for a response. Detected protocols and services may include, among others, Bonjour®, Simple Network Management Protocol (SNMP), and Network mapper (Nmap). Network regulator 18 may then determine a device type of client system 12 locally, according to such device-type-indicative data, using a set of rules, a decision tree, and/or a machine-learning algorithm. In an alternative embodiment, device-type indicative data is sent to configuration server 52 (step 406), which identifies the device type according to the received data and according to information stored in device feature database 56. For instance, server 52 may try to match features of client system 12 to various entries of database 56, wherein each such entry may correspond to a distinct device type (possibly including distinct versions of a product, distinct operating systems, etc.). Device discovery may proceed in an iterative fashion: server 52 may perform a preliminary determination of a device type according to the available information about the client system. In response to the preliminary determination, server 52 may request further device-type-indicative data about the client system from network regulator 18. Progressively more device-type-indicative data is sent to configuration server 52, until a positive identification of the device type of client system 12 is achieved. When the device type was successfully identified, server 52 may send a notification to regulator 18. In response to receiving the notification (step 408), regulator 18 may redirect the network connection request intercepted in step 400 to an agent installer application.

An alternative device discovery and/or agent provisioning scenario may involve tunneling, in the manner similar to the one described above in relation to the automatic detection of router 19 (FIGS. 13-14). In one such example, regulator 18 opens a communication tunnel (e.g., an SSH tunnel) connecting regulator 18 with server 52. The respective tunnel may be configured with port forwarding, so that communications received from server 52 are redirected by network regulator 18 to the respective client system 12. Server 52 may then directly deliver an agent installer to client system 12 via the tunnel, and may further instruct client system 12 to install the respective agent. Server 52 may also use the SSH tunnel to obtain device-type-indicative information from client system 12, using any of the methods described above.

A broad variety of utility agents may be provisioned using systems and methods described herein. An exemplary utility agent 41 configured to provide security services may perform a security assessment of client system 12 (e.g., a local malware scan) and may send security assessment data to configuration server 52 or security server 50. The server(s) may then forward a security indicator to administration device 20 for display to the user/administrator. Exemplary security indicators displayed to the user/administrator may include, among others, an indicator of whether a particular software object (e.g., the operating system) executing on client system 12 is up to date, and an indicator of a strength of a password used to protect client system 12. Other exemplary actions performed by a security agent include updating software and/or security policies for the respective client system. In some embodiments, agent 41 is configured to filter network traffic to/from client system 12 using a network packet inspection algorithm to determine, for instance, whether client system 12 is subject to a malicious attack. Additional functionality of a utility agent providing computer security services is detailed below.

An exemplary utility agent 41 configured to provide secure communication services includes a virtual private network (VPN) agent. Such agents may protect client system 12 when client system 12 leaves local network 14 (for instance, when the user leaves home with his/her mobile telephone). Such an agent may collaborate with network regulator 18 and/or configuration server 52 to open a secure communication tunnel and/or to set up a VPN between the respective client system and security server 50 (more details below).

An exemplary utility agent 41 configured to provide parental control services may monitor the usage of client system 12, and report usage patterns to a supervisor user (e.g., parent) via administration device 20. Agent 41 may further prevent client system 12 from accessing certain remote resources (e.g., IP addresses, websites, etc.), or from using certain locally-installed applications (e.g., games). Such blocking may be enforced permanently, or according to a user specific schedule.

An exemplary utility agent 41 configured to provide remote technical assistance may automatically configure and/or open a secure communication channel (e.g., an SSH tunnel) between client system 12 and configuration server 52. Configuration and/or troubleshooting commands may then be transmitted from server 52 to client system 12, possibly without explicit involvement or assistance from a user of client system 12.

Some client systems, such as home appliances, wearable devices, etc., may not be capable of installing a utility agent as indicated above. However, such devices may include built-in configuration and/or device management agents enabling a remote command of the respective devices. Some embodiments of the present invention may use the existing management agents and device-specific protocols and/or communication methods to communicate parameter value updates to such devices. Even for such devices, correctly identifying the device type enables configuration server 52 to properly format and communicate configuration commands to the respective client systems. To facilitate determination of the device type of such client systems, network regulator 18 may either actively parse communications received from the respective client system, or re-route the respective communications to configuration server 52.

In some embodiments, network regulator 18 may condition access of client system 12 to extended network 16 upon a successful installation of utility agent 41. As illustrated by step 416 in FIG. 18, some embodiments may allow client system to access extended network 16 only in response to agent installation. Such configurations may improve security of client system 12 and/or of local network 14.

Device Management

Once utility agents 41 are functional, they may be used to perform various device management tasks, for instance to remotely configure the respective client systems 12a-f. Exemplary configuration tasks include, among others, turning a client system on or off (e.g., arming or disarming a home security system, turning lights on and off), setting a value of a functional parameter of a client system (e.g., setting a desired temperature on a smart thermostat), configuring network and/or security features (e.g., blocking or allowing access of certain client systems to network 14, configuring firewall parameters, configuring parental control applications and/or features), performing software updates for components executing on the respective client system, and performing technical assistance/troubleshooting tasks in relation to the respective client system.

In some embodiments, a user/administrator may remotely manage client system 12 via administration GUI 48 exposed by administration device 20 (e.g., a smartphone running an administration application). Following registration of network regulator 18 with configuration server 52, server 52 may uniquely associate regulator 18 and administration device 20 with a subscription. The respective subscription also allows uniquely associating regulator 18 with the set of client systems 12a-f protected by the respective network regulator. Therefore, the user of administration device 20 may be able to select a specific client system to remotely manage from administration GUI 48, with the assistance of configuration server 52. The actual device management (e.g., setting parameter values) may comprise transmitting data and/or configuration commands between administration device 20 and the respective client system.

In some embodiments, transmission of configuration data/commands to a target client system uses a variation of the systems and methods described above, in relation to configuring router 19 (FIGS. 13-14) and to device discovery. In response to receiving a device management to request from administration device 20, server 52 may send a notification to network regulator 18, the notification causing regulator 18 and/or the target client system to open a communication tunnel (e.g., SSH tunnel) between server 52 and regulator 18 and/or between server 52 and the target client system. The tunnel may be configured with port forwarding as described above. Such a tunnel may then be used to transmit configuration commands from server 52 to the target client system, the respective commands crafted, for instance, to change configuration settings of the respective client system. In some embodiments, such configuration commands are executed by utility agent 41. When the targeted client system lacks a utility agent or cannot install such an agent, configuration commands are aimed at the native management software of the respective device.

In one exemplary application, a user may request technical assistance/troubleshooting of a particular target client system using methods described above. Technical assistance may then proceed automatically, without further involvement of the respective user. As part of troubleshooting, some embodiments of server 52 may determine the target client system to install a dedicated utility agent configured to solve a particular technical problem.

Computer Security Protection

FIGS. 19-A-B show exemplary embodiments wherein network regulator 18 collaborates with security server 50 to protect client systems 12a-f from computer security threats such as malware, adware, spyware, and network intrusion. In the embodiment of FIG. 19-A, network regulator 18 re-routes some or all of the data traffic (herein illustrated by network packet 80) between protected client system 12 and a computer system external to the local network through security server 50. Such re-routing may be achieved, for instance, by installing network regulator 18 as gateway between local network 14 and extended network 16, and using regulator 18 to intercept network traffic and actively redirect it to server 50. In embodiments as illustrated in FIG. 19-A, threat detection is performed by security server 50, using any method known in the art (e.g., by analyzing network packets 80 to determine whether they contain malware, or whether they are indicative of a network intrusion).

In some embodiments, as illustrated in FIG. 19-B, threat detection is performed by network regulator 18. Such local detection may comprise, for instance, filtering packet content. Regulator 18 may keep malware detection algorithms up to date by downloading a set of filter parameters 82 (e.g. malware-indicative signatures) from security server 50. Some embodiments may combine threat detection on regulator 18 with threat detection at security server 50. In one such example, network regulator 18 may carry out a preliminary analysis of data traffic, using, for instance, relatively inexpensive methods. Regulator 18 may then send suspect network packets for further analysis to server 50.

Re-routing traffic through security server 50 (FIG. 19-A) may have several advantages over performing a local security analysis (FIG. 19-B). Server 50 may comprise multiple purpose-built, high-throughput computer systems, and may therefore be able to carry out computationally intensive traffic analysis, such as deep packet inspection, much more efficiently than regulator 18. Installing such capabilities in network regulator 18 would substantially increase the price, complexity, and attack surface of regulator 18. Another advantage of having centralized data analysis is that such configurations eliminate the need to distribute updates of malware-identifying signatures and of other data used in network packet analysis to a large number of distributed network regulators 18. Centralized security systems are also typically better equipped to respond to newly discovered threats.

An exemplary application of such computer security systems and methods comprises blocking access of a protected client system to malicious or fraudulent webpages. In one such example, a request to access a remote resource (e.g., a HTTP request from a protected client system) is intercepted and analyzed to determine whether access to the remote resource, webpage, etc., represents a computer security risk. Such analysis may use any method known in the art, for instance matching an address of the respective resource against a blacklist of known malicious or fraudulent webpages, analyzing the layout of the respective webpage, etc. The analysis may be carried out at security server 50 (e.g., in a configuration as shown in FIG. 19-A) or at network regulator 18 (e.g., as shown in FIG. 19-B). When the analysis establishes that accessing the remote resource does not amount to a computer security risk, the respective client system is allowed access to the respective remote resource. When access is deemed risky, the requesting client system may be blocked from accessing the respective resource. In addition to blocking access, some embodiments of security server 50 send an event notification to administration device 20, informing the user/administrator of network regulator 18 that a security event has occurred. The notification may include an indicator of the client system involved in the respective event, and an indicator of a type of event (e.g., access to a fraudulent website).

Figure 20:
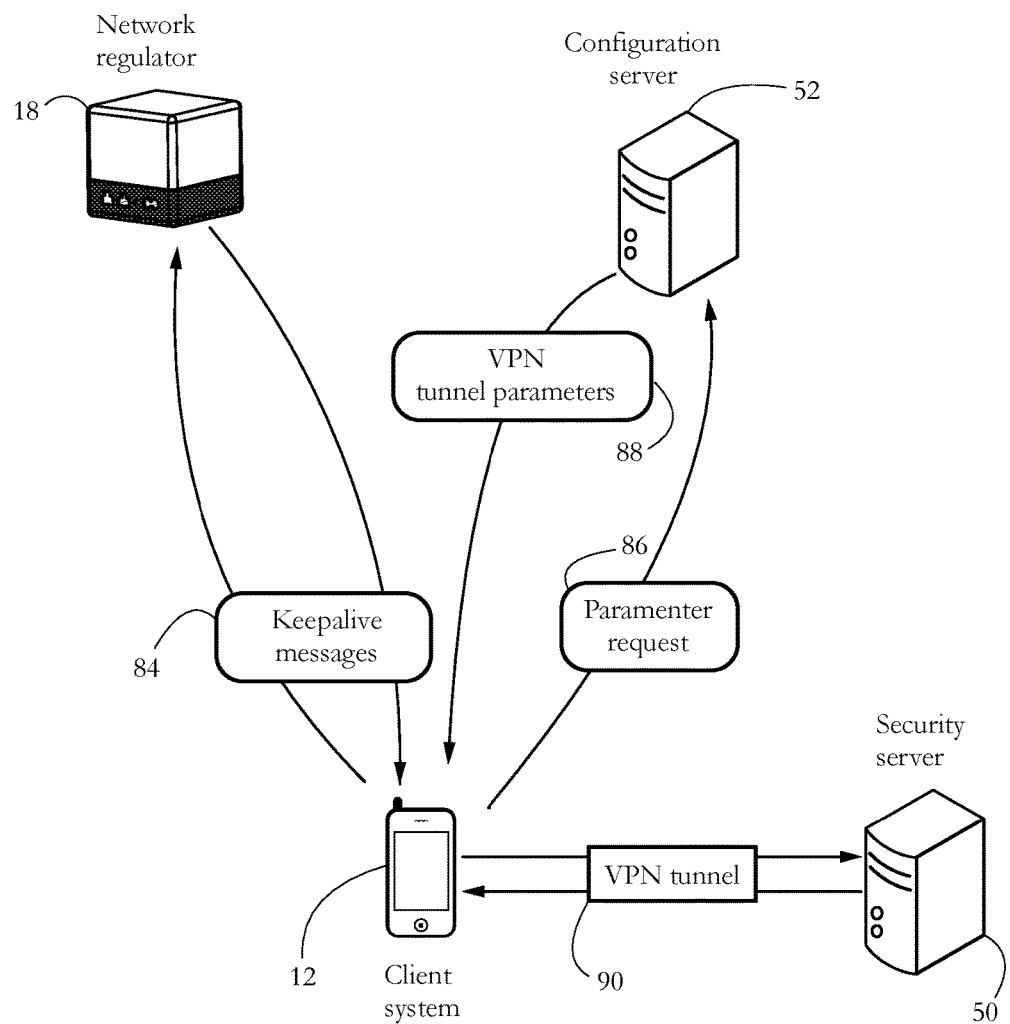
FIG. 20 shows an exemplary data exchange between a client system, the network regulator and the configuration server as part of configuring a virtual private network (VPN) utility agent and a secure connection for a protected client system, according to some embodiments of the present invention.
Figure 21:
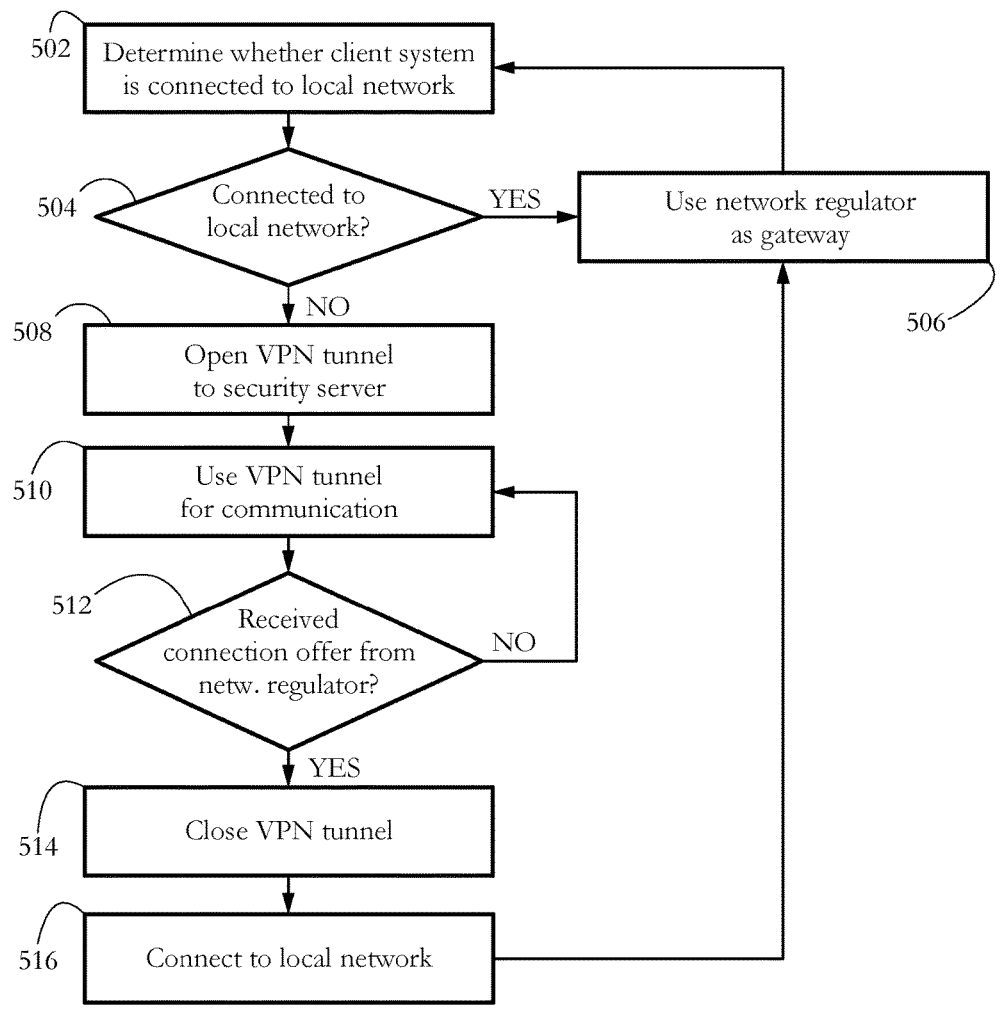
FIG. 21 illustrates an exemplary sequence of steps performed by the client system to operate a VPN agent according to some embodiments of the present invention.

Another exemplary application of a computer security system according to some embodiments of the present invention is illustrated in FIGS. 20-21. As shown above, a client system may be protected against computer security threats while connected to network regulator 18 over local network 14. Leaving network 14 (as happens, for instance, when a user leaves home with his/her mobile phone) may however expose the respective client system to various security risks. Some embodiments ensure that, once registered for protection with regulator 18 and configuration server 52, the respective client system is protected at all times.

To achieve such protection, some embodiments install a utility agent 41 on the respective client system (e.g., mobile phone, tablet computer), utility agent 41 configured to manage a virtual private network (VPN) connecting the respective client system with security server 50. When the respective client system has a built-in VPN agent, some embodiments may opt for configuring the existing VPN agent, instead of installing utility agent 41. A VPN connection (tunnel) to security server 50 may be initiated, for instance, when the respective client system leaves local network 14. By maintaining a connection with security server 50 even when away from local network 14, some embodiments may continue to use computer security methods described above (e.g., to re-route traffic via security server 50) to protect the respective client system.

FIG. 20 shows an exemplary data exchange between client system 12, network regulator 18, and configuration server 52, the exchange occurring as part of operating a VPN utility agent and an associated secure connection with security server 50. FIG. 21 shows an exemplary sequence of steps performed by client system 12 operating the VPN utility agent according to some embodiments of the present invention.

The VPN utility agent executing on client system 12 may obtain connection parameters 88 for establishing a VPN tunnel with security server 50 from configuration server 52. Such parameters may be tailored to the device type of client system 12, as discussed above. In some embodiments, a sequence of steps 502-504 determines whether client system 12 is currently part of local network 14 (i.e., the local network serviced by network regulator 18). Step 502 may proceed according to any method known in the art, for instance, by maintaining a stream of keepalive messages 84 between regulator 18 and the respective client system. While client system 12 remains connected to local network 14, client system 12 may use regulator 18 as gateway for accessing external network 16, being protected against computer security threats according to methods described above.

When client system 12 detects that it is no longer connected to local network 14, in a step 510, the VPN agent executing on client system 12 may open a VPN tunnel 90 to security server 50, configuring tunnel 90 according to VPN parameters 88. Client system 12 may thereafter use VPN tunnel 90 for communication such as Internet browsing, messaging, etc. In an alternative embodiments, network regulator 18 may determine that client system 12 has left local network 14, and in response, notify security server 50. Establishing tunnel 90 may then be initiated by server 50.

When client system 12 returns to the proximity of network regulator 18 (for instance, when the user returns home with his/her mobile phone), client system 12 may detect an offer of network services (e.g., a DHCP offer) from network regulator 18. When receiving such an offer to connect to local network 14, in a sequence of steps 514-516, the VPN utility agent executing on the respective client system may close VPN tunnel 90 and connect to local network 14.

The exemplary systems and methods described herein allow protecting a plurality of client systems against computer security threats, such as malicious software and network intrusion. Besides protecting conventional computer systems, the described systems and methods are particularly suited for protecting a diverse ecosystem of intelligent devices connected to the Internet, such as devices collectively known in popular culture as the Internet of Things (IoT). Examples of such devices include, among others, wearable devices (e.g., smartwatches, fitness bands, interactive jewelry), home entertainment devices (TVs, media players, game consoles), home appliances (refrigerators, thermostats, intelligent lighting systems, home security systems). Some embodiments allow, for instance, protecting all electronic devices in a home using a unified, integrated solution.

Some embodiments include a network regulator configured to set up and manage a local network interconnecting the plurality of protected client systems. The network regulator may install itself in a position of gateway between the local network and an extended network such as the Internet. In some embodiments, protection is achieved by the network regulator re-routing at least a part of data traffic exchanged between a protected client system and an entity outside the local network through a remote security server. The traffic may then be scanned for malware, and access to risky resources (e.g., malicious or fraudulent web sites) blocked.

Some embodiments ensure that protection against computer security threats continues even when the respective client system leaves the local network. For instance, when a user leaves home with his/her mobile phone, the phone retains protection. In some embodiments, such protection is achieved by automatically detecting that a protected client system has left the local network, and in response, automatically activating a tunnel (e.g., a point-to-point VPN connection) to the security server, tunnel which is used to carry data traffic to/from the respective device while the device is away from the local network.

In some embodiments, the network regulator is uniquely associated with a service subscription, which allows a unified management of security and other aspects for all protected client systems, e.g., for all intelligent devices within a home. A security event, such as an attempt by a protected client system to access a fraudulent website, may thus be automatically associated with a subscription account, and reported to a contact person/administrator of the respective account. Reporting of security events may comprise sending a notification to an administration device (e.g., mobile phone) of the administrator. In some embodiments, such notifications are centralized by the security server and grouped per user and/or per device. A graphical user interface (GUI) executing on the administration device may display information about each security event, statistical data, etc. Some embodiments of the present invention therefore allow a centralized solution for managing computer security for a large number of customers/accounts, each such account associated with its own diverse group of devices.

Aside from ensuring protection of client systems connected to the local network, some embodiments provide a unified solution for automatic configuration, troubleshooting/technical assistance, and remote management of the protected client systems. Some embodiments install a utility agent on each protected device, the utility agent collaborating with remote servers to receive configuration data and/or executable code. The user/administrator of the a client system may remotely manage the respective device via a user interface displayed on an administration device (e.g., mobile phone). Such management may include, for instance, setting operational parameters (a desired home temperature, a parental control setting, etc.), applying software updates, and troubleshooting.

Some embodiments of the present invention are specifically crafted for ease of use, so as to not necessitate specialized knowledge of computer engineering or network administration. For instance, upon installation, network regulator may automatically take over some network services from an existing router, to become the default provider of Internet access for the local network.

It will be clear to a skilled artisan that the above embodiments may be altered in many ways without departing from the scope of the invention. Accordingly, the scope of the invention should be determined by the following claims and their legal equivalents.

What is claimed is:

1. A network regulator connected to a plurality of client systems over a local network, wherein a router connected to the local network is configured to assign a first plurality of network addresses to the plurality of client systems, each of the first plurality of network addresses selected from a first range of addresses, wherein the network regulator comprises a hardware processor and a memory, the hardware processor configured to:
   automatically reconfigure at least one of the router and the local network to prevent an assignment by the router of network addresses from the first range of addresses;
   assign a second plurality of network addresses to the plurality of client systems, each of the second plurality of network addresses selected from a second range of addresses distinct from the first range of addresses;
   in response to automatically reconfiguring the at least one of the router and the local network, intercept a request by a client system of the plurality of client systems to access a resource located outside the local network; and
   in response to intercepting the request, transmit an indicator of the request to a remote security server for analysis, wherein the security server is configured to determine whether accessing the resource constitutes a computer security threat to the client system.

2. The network regulator of claim 1, wherein automatically reconfiguring the at least one of the router and the local network comprises incapacitating the router.

3. The network regulator of claim 1, wherein automatically reconfiguring the at least one of the router and the local network comprises employing the hardware processor to transmit a set of instructions to the router, the set of instructions configured so that executing the set of instructions by the router causes a disruption of a process or assigning network addresses to client systems.

4. The network regulator of claim 1, wherein automatically reconfiguring the at least one of the router and the local network comprises adjusting a set of configuration parameters of the router to cause a disruption of a process of assigning network addresses to client systems.

5. The network regulator of claim 4, wherein automatically reconfiguring the at least one of the router and the local network further comprises, in preparation for adjusting the set of configuration parameters:
   causing the router to expose a configuration interface enabling an adjustment of the set of configuration parameters; and
   automatically filling in a set of fields of the configuration interface.

6. The network regulator of claim 4, wherein automatically reconfiguring the at least one of the router and the local network further comprises, in preparation for adjusting the set of configuration parameters, receiving from a remote configuration server a set of user credentials for logging into a configuration interface of the router.

7. The network regulator of claim 1, wherein automatically reconfiguring the at least one of the router and the local network comprises:
   automatically determining a device type of the router, wherein determining the device type comprises determining an item selected from a group consisting of a make of the router, a model of the router, and a version of a software executing on the router; and
   configuring according to the device type of the router a sequence of actions executed by the network regulator in the course reconfiguring the at least one of the router and the local network.

8. The network regulator of claim 1, wherein automatically reconfiguring the at least one of the router and the local network comprises employing the hardware processor to impersonate a plurality of fictitious devices requesting to connect to the local network.

9. The network regulator of claim 1, wherein automatically reconfiguring the at least one of the router and the local network comprises employing the hardware processor to:
   detect an address availability probe sent by an entity connected to the local network, the entity selected from a group consisting of the router and of the client system, the address availability probe sent to a target network address distinct from a current network address of the network regulator;
   in response to detecting the address availability probe, transmit a response to the entity, the response indicating that the target network address is currently in use.

10. The network regulator of claim 1, wherein automatically reconfiguring the at least one of the router and the local network further comprises configuring the network regulator as a gateway to the local network.

11. The network regulator of claim 1, wherein transmitting the indicator of the request to the security server comprises re-routing the request to the security server.

12. The network regulator of claim 1, wherein the request comprises a hypertext transfer protocol (HTTP) request.

13. The network regulator of claim 1, wherein the hardware processor is further configured to perform the automatic reconfiguration of the at least one of the router and the local network in response to receiving from a remote configuration server a permission indicator indicating that an administrator of the local network agrees to the reconfiguration of the at least one of the router and the local network.

14. A security server comprising at least one hardware processor and a memory, the at least one hardware processor configured to:
   receive from a network regulator connected to a remote network an indicator of a request by a client system connected to the remote network to access a resource located outside the remote network; and in response to receiving the indicator of the request, determine whether accessing the resource constitutes a computer security threat to the client system, wherein the network regulator is connected to a router over the remote network, the router configured to assign a first plurality of network addresses to a plurality of client systems including the client system, each of the first plurality of network addresses selected from a first range of addresses, wherein the network regulator is configured to:

automatically reconfigure at least one of the router and the local network, to prevent an assignment by the router of network addresses from the first range of addresses;

assign a second plurality of network addresses to the plurality of client systems, each of the second plurality of network addresses selected from a second range of addresses distinct from the first range of addresses;

in response to automatically reconfiguring the at least one of the router and the local network, intercept the request; and in response to intercepting the request, transmit the indicator of the request to the security server.

15. The security server of claim 14, wherein the at least one hardware processor is further configured to:

in response to determining whether accessing the resource constitutes a computer security threat to the client system, when accessing the resource does not constitute the security threat, allow the client system access to the resource; and in response to determining whether accessing the resource constitutes a computer security threat to the client system, when accessing the resource does constitute the security threat, prevent the client system from accessing the resource.

16. The security server of claim 14, wherein the at least one hardware processor is further configured, in response to determining whether accessing the resource constitutes the computer security threat, when accessing the resource does constitute the security threat, transmit a security notification to the network regulator.

17. The security server of claim 14, wherein reconfiguring the at least one of the router and the local network comprises incapacitating the router.

18. The security server of claim 14, wherein reconfiguring the at least one of the router and the local network comprises employing the network regulator to transmit a set of instructions to the router, the set of instructions configured so that executing the set of instructions by the router causes a disruption of a process of assigning network addresses to client systems.

19. The security server of claim 14, wherein reconfiguring the at least one of the router and the local network comprises employing the network regulator to adjust a set of configuration parameters of the router to cause a disruption of a process of assigning network addresses to client system.

20. The security server of claim 19, wherein reconfiguring the at least one of the router and the local network further comprises, in preparation for adjusting the set of configuration parameters:

causing the router to expose a configuration interface enabling an adjustment of the set of configuration parameters; and employing the network regulator to automatically fill in a set of fields of the configuration interface.

21. The security server of claim 19, wherein reconfiguring the at least one of the router and the local network further comprises, in preparation for adjusting the set of configuration parameters, employing the network regulator to receive from a remote configuration server a set of user credentials for logging into a configuration interface of the router.

22. The security server of claim 14, wherein taking over the network service comprises:

employing the network regulator to automatically determine a device type of the router, wherein determining the device type comprises determining an item selected from a group consisting of a make of the router, a model of the router, and a version of a software executing on the router; and employing the network regulator to configure, according to the device type of the router, a sequence of actions executed by the network regulator in the course of reconfiguring the at least one of the router and the local network.

23. The security server of claim 14, wherein reconfiguring the at least one of the router and the local network comprises employing the network regulator to impersonate a plurality of fictitious devices requesting to connect to the remote network.

24. The security server of claim 14, wherein reconfiguring the at least one of the router and the local network comprises employing the hardware processor to:

detect an address availability probe sent by an entity connected to the remote network, the entity selected from a group consisting of the router and of the client system, the address availability probe sent to a target network address distinct from a current network address of the network regulator;

in response to detecting the address availability probe, transmit a response to the entity, the response indicating that the target network address is currently in use.

25. The security server of claim 14, wherein reconfiguring the at least one of the router and the local network comprises configuring the network regulator as a gateway to the remote network.

26. The security server of claim 15, wherein the network regulator is configured to re-route the request to the security server.

27. The security server of claim 14, wherein the request comprises a hypertext transfer protocol (HTTP) request.

28. The security server of claim 14, wherein the network regulator is further configured to perform the automatic reconfiguration of the at least one of the router and the local network in response to receiving from a remote configuration server a permission indicator indicating that an administrator of the remote network agrees to the reconfiguration of the at least one of the router and the local network.

29. A non-transitory computer readable medium storing instructions which, when executed by at least one hardware processor of a network regulator, cause the network regulator to perform a set of actions, wherein the network regulator is connected to a plurality of client systems over a local network, wherein a router connected to the local network is configured to assign a first plurality of network addresses to the plurality of client systems, each of the first plurality of network addresses selected from a first range of addresses, and wherein the set of actions comprises:

automatically reconfigure at least one of the router and the local network, to prevent an assignment by the router of network addresses from the first range of addresses;

assign a second plurality of network addresses to the plurality of client systems, each of the second plurality of network addresses selected from a second range of addresses distinct from the first range of addresses;

in response to automatically reconfiguring the at least one of the router and the local network, intercept a request by a client system of the plurality of client systems to access a resource located outside the local network; and in response to intercepting the request, transmit an indicator of the request to a remote security server for analysis, wherein the security server is configured to determine whether accessing the resource constitutes a computer security threat to the client system.

30. The network regulator of claim 1, wherein the hardware processor is further configured, in preparation for reconfiguring the at least one of the router and the local network, to:

transmit an address request to the router, the address request configured to cause the router to assign a network address to the network regulator, and determine according to a content of a response to the address request a sequence of actions executed by the network regulator in the course of taking over the network service.

\* \* \* \* \*